(12) United States Patent
Kanno

(10) Patent No.: US 9,848,100 B2
(45) Date of Patent: Dec. 19, 2017

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Shoichi Kanno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/567,413

(22) Filed: Dec. 11, 2014

(65) Prior Publication Data

US 2015/0172484 A1 Jun. 18, 2015

(30) Foreign Application Priority Data

Dec. 18, 2013 (JP) .................................. 2013-261766

(51) Int. Cl.
*G06F 3/12* (2006.01)
*H04N 1/00* (2006.01)

(52) U.S. Cl.
CPC ......... *H04N 1/0097* (2013.01); *G06F 3/1205* (2013.01); *G06F 3/1232* (2013.01); *G06F 3/1255* (2013.01); *G06F 3/1285* (2013.01)

(58) Field of Classification Search
CPC ... H04N 1/0097; G06F 3/1232; G06F 3/1255; G06F 3/1285; G06F 3/1205
USPC ..................................... 358/1.13, 1.15, 1.16
See application file for complete search history.

(56) References Cited

U.S. PATENT DOCUMENTS

| 8,730,488 B2 | 5/2014 | Kakitsuba | |
|---|---|---|---|
| 2011/0286022 A1* | 11/2011 | Kakitsuba | G06F 3/1204 358/1.13 |
| 2013/0301069 A1* | 11/2013 | Yanagi | G06F 3/1204 358/1.13 |
| 2014/0115608 A1* | 4/2014 | Shirasaka | G06F 9/4411 719/321 |

FOREIGN PATENT DOCUMENTS

| JP | 2008-003784 A | 1/2008 |
|---|---|---|
| JP | 2008-310799 A | 12/2008 |

(Continued)

OTHER PUBLICATIONS

Japanese Office Action issued in corresponding application No. 2013-261766, dated Aug. 29, 2017.

(Continued)

*Primary Examiner* — Kent Yip
(74) *Attorney, Agent, or Firm* — Carter, DeLuca, Farrell & Schmidt, LLP

(57) ABSTRACT

An information processing apparatus has: a selection unit for selecting device type information in which function settings of a printer have been defined; an obtaining unit for obtaining configuration information regarding a function construction of the printer as an output target; and a generation unit for generating new device type information on the basis of the selected device type information in the case where among functions regarding the function construction shown by the configuration information obtained by the obtaining unit, there is a function which is not included in functions regarding the function settings shown by the device type information selected by the selection unit.

17 Claims, 22 Drawing Sheets

(56) References Cited

FOREIGN PATENT DOCUMENTS

| | | |
|---|---|---|
| JP | 2010-129043 A | 6/2010 |
| JP | 2011-060151 A | 3/2011 |
| JP | 2011-243067 A | 12/2011 |
| JP | 2012141732 A | 7/2012 |

OTHER PUBLICATIONS

Japanese Office Action dated Oct. 17, 2017 for application No. 2013-261766 with English translation (19 pages).

* cited by examiner

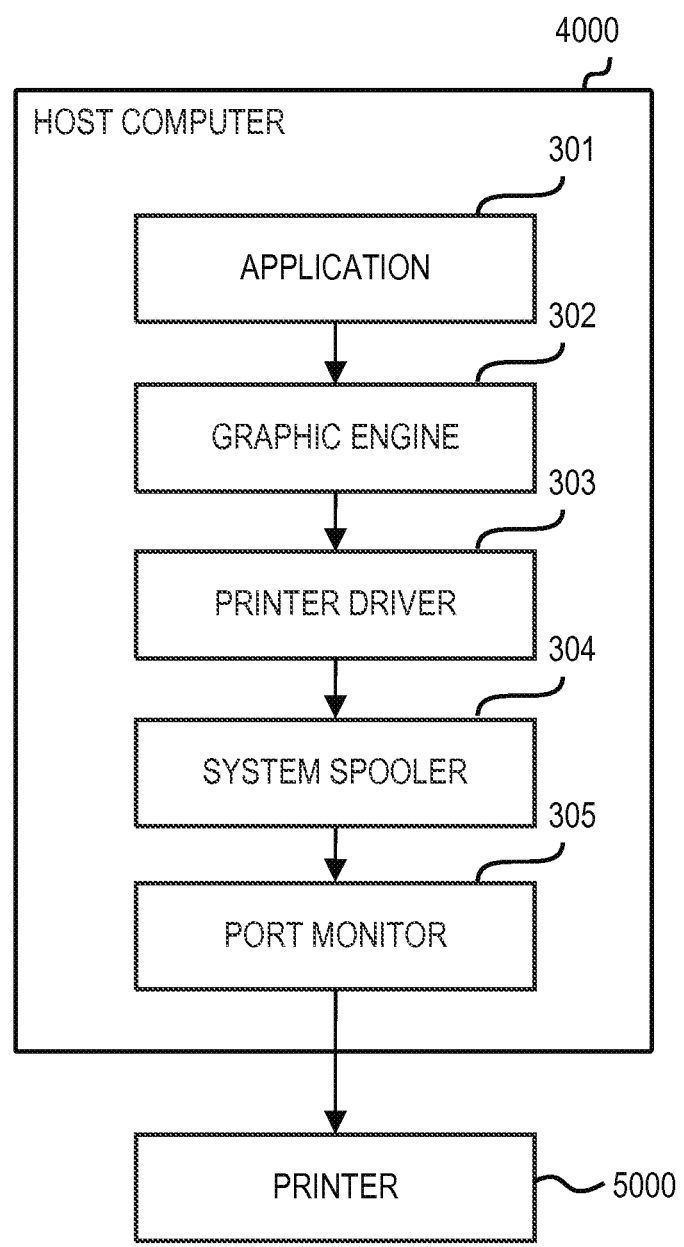

FIG. 4

| CAPABILITY NUMBER 401 | CAPABILITY 402 | MODEL SPECIFIC CAPABILITY 403 | DEVICE TYPE 400 | | | |
|---|---|---|---|---|---|---|
| | | | STANDARD 404 | SFP Series 405 | MFP Series 406 | Production Series 407 |
| 1 | COLOR MODE | NO | B&W | B&W | COLOR | COLOR |
| 2 | STAPLING | NO | DISABLED | OFF | ON | ON |
| 3 | DUPLEX PRINTING | NO | DISABLED | ON | ON | ON |
| 4 | BOOKBINDING PRINTING | NO | DISABLED | DISABLED | OFF | ON |
| 5 | CASE BINDING | NO | DISABLED | DISABLED | DISABLED | ON |
| 6 | PROCESSING METHOD OF PAPER KIND | YES | NONE | FIXING TEMPERATURE SETTING | PAPER FEEDING STAGE SELECTION | PAPER FEEDING STAGE SELECTION |
| 7 | PROCESSING CAPABILITY OF PAPER SIZE | YES | A4 | A4 | A3 | 11*17 |

| NO. | HEADER | CNDevTypeP |
|---|---|---|
| 1 | DEVICE TYPE | STANDARD |
|  | COLOR MODE | B&W = 1, COLOR = 0 |
| 7 | PAPER SIZE CAPABILITY | A4 TYPE: A5, B5, A4 |

| NO. | HEADER | CNDevTypeP |
|---|---|---|
| 1 | DEVICE TYPE | SFP Series |
| 2 | COLOR MODE | B&W = 1, COLOR = 0 |
|  | STAPLING | NONE = 1, UPPER LEFT = 0 |
| 3 | DUPLEX PRINTING | ON |
| 6 | PROCESSING METHOD OF PAPER KIND | FIXING TEMPERATURE SETTING |
| 7 | PAPER SIZE CAPABILITY | A4 TYPE: A5, B5, A4, POSTCARD, ENVELOPE |

| NO. | HEADER | CNDevTypeP |
|---|---|---|
| 1 | DEVICE TYPE | MFP Series |
| 2 | COLOR MODE | B&W = 0, COLOR = 1 |
|  | STAPLING | NONE = 1, UPPER LEFT = 0 |
| 3 | DUPLEX PRINTING | ON |
| 4 | BOOKBINDING PRINTING | OFF |
| 6 | PROCESSING METHOD OF PAPER KIND | PAPER FEEDING STAGE SELECTION |
| 7 | PAPER SIZE CAPABILITY | A3 TYPE: A5, B5, A4, B4, A3, POSTCARD, ENVELOPE |

| NO. | HEADER | CNDevTypeP |
|---|---|---|
| 1 | DEVICE TYPE | PRODUCTION Series |
| 2 | COLOR MODE | B&W = 0, COLOR = 1 |
| 3 | STAPLING | NONE = 1, UPPER LEFT = 0, UPPER RIGHT = 0, SHORT SIDE DOUBLE = 0, LONG SIDE DOUBLE = 0 |
| 4 | DUPLEX PRINTING | ON |
| 5 | BOOKBINDING PRINTING | ON |
| 6 | CASE BINDING | ON |
| 7 | PROCESSING METHOD OF PAPER KIND | PAPER FEEDING STAGE SELECTION |
| 8 | PAPER SIZE CAPABILITY | A3 TYPE: A5, B5, A4, B4, A3, 11"17, POSTCARD, ENVELOPE |

| NO. | HEADER | CNDevTypeD |
|---|---|---|
| 1 | DEVICE TYPE | STANDARD 2 |
| 2 | COLOR MODE | B&W = 1, COLOR = 0 |
| ... | STAPLING | NONE = 1, UPPER LEFT = 0 |
| 7 | PAPER SIZE CAPABILITY | A4 TYPE: A5, B5, A4 |

| NO. | HEADER | CNDevTypeD |
|---|---|---|
| 1 | DEVICE TYPE | STANDARD LBP-100 169.254.10.10 |
| 2 | COLOR MODE | B&W = 1, COLOR = 0 |
| ... | STAPLING | NONE = 1, UPPER LEFT = 0 |
| 7 | PAPER SIZE CAPABILITY | A4 TYPE: A5, B5, A4 |

INFORMATION PROCESSING APPARATUS, INFORMATION PROCESSING METHOD, AND PROGRAM

BACKGROUND OF THE INVENTION

Field of the Invention

The present invention relates to an information processing apparatus, an information processing method, and a program.

Description of the Related Art

The Official Gazette of Japanese Patent Application Laid-Open No. 2011-243067 discloses such a technique that function information and attribute capability information of each printer model are held as a database in a printer driver and functions and attributes which can be used are specified on the basis of identification information of the printers which are connected. According to the Official Gazette of Japanese Patent Application Laid-Open No. 2011-243067, a plurality of printers and functions which each printer has are displayed as a search result of the printer. However, according to such a technique, since the function information and the attribute capability information of each printer model have to be held as a database in the printer driver, there is a case where a suitable function cannot be set to a printer having unknown specifications. According to such a technique, nothing is considered to such a case where, for example, the functions which the user does not use or unnecessary functions among the functions which each printer has are edited.

SUMMARY OF THE INVENTION

It is an aspect of the invention to provide a technique for improving usability of the user who makes function settings of a printer.

According to an aspect of the invention, there is provided an information processing apparatus comprising: a selection unit configured to select device type information in which function settings of a printer have been defined; an obtaining unit configured to obtain configuration information regarding a function construction of the printer as an output target; and a generation unit configured to generate new device type information on the basis of the selected device type information in the case where among functions regarding the function construction shown by the configuration information obtained by the obtaining unit, there is a function which is not included in functions regarding the function settings shown by the device type information selected by the selection unit.

Further features of the present invention will become apparent from the following description of exemplary embodiments with reference to the attached drawings.

BRIEF DESCRIPTION OF THE DRAWINGS

FIG. 3 is a diagram illustrating an example of a function construction of the host computer.

FIG. 4 is a diagram illustrating an example of a setting information list regarding function settings of each device type.

FIGS. 13A, 13B, 13C, 13D, 13E and 13F are diagrams illustrating examples of device type information.

DESCRIPTION OF THE EMBODIMENTS

Figure 1:
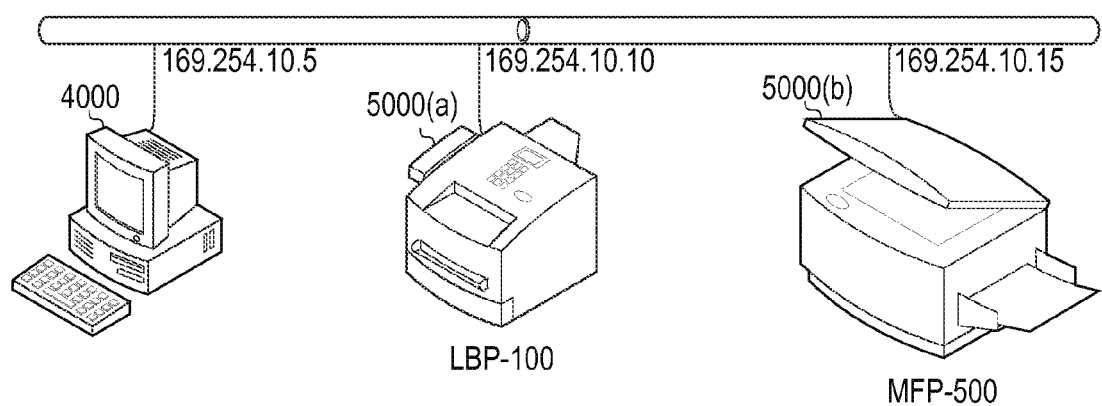
FIG. 1 is a diagram illustrating an example of a system configuration.

Best modes for embodying the invention will be described hereinbelow with reference to the drawings.

Embodiment 1

A universal printer driver for controlling a plurality of kinds of printers having different functions does not contain function information of each model of the printer (hereinbelow, simply referred to as "model") into a database but can change all capabilities including specific capabilities peculiar to the model by configuration settings. That is, the universal printer driver also sets the model specific capabilities to targets of the configuration settings in addition to the common capabilities. The universal printer driver does not construct a print setting screen on the basis of the function information in the internal database but constructs a print setting screen on the basis of the configuration settings.

An information processing apparatus having the universal printer driver which can also support a printer having unknown specifications as mentioned above will be described hereinbelow.

First, terminologies which are used in the following description will be defined.

"capability" denotes a function which can be used by a printer connected to the information processing apparatus through a network (hereinbelow, simply referred to as "connected") and indicates an item displayed on the print setting screen. For example, in the case where a duplex unit or the like has been mounted in the printer connected to the information processing apparatus and <duplex printing> can be performed, it is said that there is a <duplex printing> capability. Setting items of the <duplex printing> capability exist on a configuration setting screen, which will be described hereinlater.

"configuration settings" is settings of the functions which can be used by the printer connected to the information processing apparatus and indicates whether or not the duplex printing can be used, whether or not the bookbinding printing can be used, and the like. Settings of the function which can be used here can be changed in "print settings" which is made by the user every print job. For example, if <duplex printing> can be used by the configuration settings, that is, if the <duplex printing> capability is On on the configuration setting screen, the user can designate <duplex printing> in addition to <simplex printing> on the print setting screen.

"maximum capability" denotes all capabilities which can be supported by the printer connected to the information processing apparatus by mounting an optional device or the like to the printer.

"current capability" denotes a capability which can be used at present by an optional device or the like actually mounted to the printer connected to the information processing apparatus. The user can make print settings within a range of the current capability. A printer driver of the information processing apparatus generates a print setting screen on the basis of the current capability.

"common capability" denotes a capability of a general printer such as duplex printing, stapling, or the like. In the printer of a model which can be used by mounting an optional device, generally, the user sets the capability by a method whereby the user manually sets it by the configuration settings or the printer driver obtains configuration information from the printer (hereinbelow, simply referred to as "configuration information obtainment from the printer"). Such configuration information (function information) denotes information regarding the function construction which the printer has.

"model specific capability" denotes a fixed function peculiar to the model. In the case of a driver per model instead of the universal printer driver, the model specific capability is a capability setting portion in which a capability is formed every model and there are many cases where the capability setting by the configuration information obtainment from the printer is not performed. For example, as <processing method of paper kind>, there is a case where a fixing mode is designated in a certain model and a selection of a paper feeding stage is designated in another model. "fixing mode" denotes a combination of a temperature setting and a paper feeding speed of a fixing drum. For example, when the user selects <thick paper> in <paper kind>, such a process that a fixing temperature is raised and the paper feeding speed is reduced as compared with those in <plain paper> is executed in the printer.

<processing capability of paper size> denotes a processing capability showing which paper size can be used every model, whether or not the duplex printing can be performed in each paper size, at which position the stapling can be performed, and the like. Those capabilities differ every model and there are many cases where the capabilities cannot be obtained by the configuration information obtainment from the printer by the printer driver. As mentioned above, differences among fine operations of the printers which cannot be fully set by the configuration information obtainment from the printer are included in "model specific capabilities" and there is a case where a capability in which a setting by the user is difficult is included.

Subsequently, a system configuration of a print system in the embodiment will be described.

FIG. 1 is a diagram illustrating an example of the system configuration of the print system in the embodiment. The system in FIG. 1 includes a host computer (information processing apparatus) 4000, a printer 5000(a), and a printer 5000(b). Hereinbelow, the printer 5000(a) and the printer 5000(b) are generally called a printer 5000.

The host computer 4000 and the printer 5000 are connected so that they can communicate with each other through a network. It is assumed that an IP address to identify an apparatus on the network has been allocated to each apparatus. "169.254.10.5" has been allocated as an IP address to the host computer 4000. "169.254.10.10" has been allocated as an IP address to the printer 5000(a). "169.254.10.15" has been allocated as an IP address to the printer 5000(b). It is assumed that a name of the printer 5000(a) is "LBP-100" and a name of the printer 5000(b) is "MFP-500".

The printer which is connected to the system of FIG. 1 may be a single printer or may be constructed by a plurality of printers so long as functions of the embodiment are realized. The connection in the system of FIG. 1 may be a local connection using a USB or the like or a connection through a network such as LAN, WAN, or the like.

Subsequently, a hardware construction of the host computer 4000 and the printer 5000 will be described.

Figure 2:
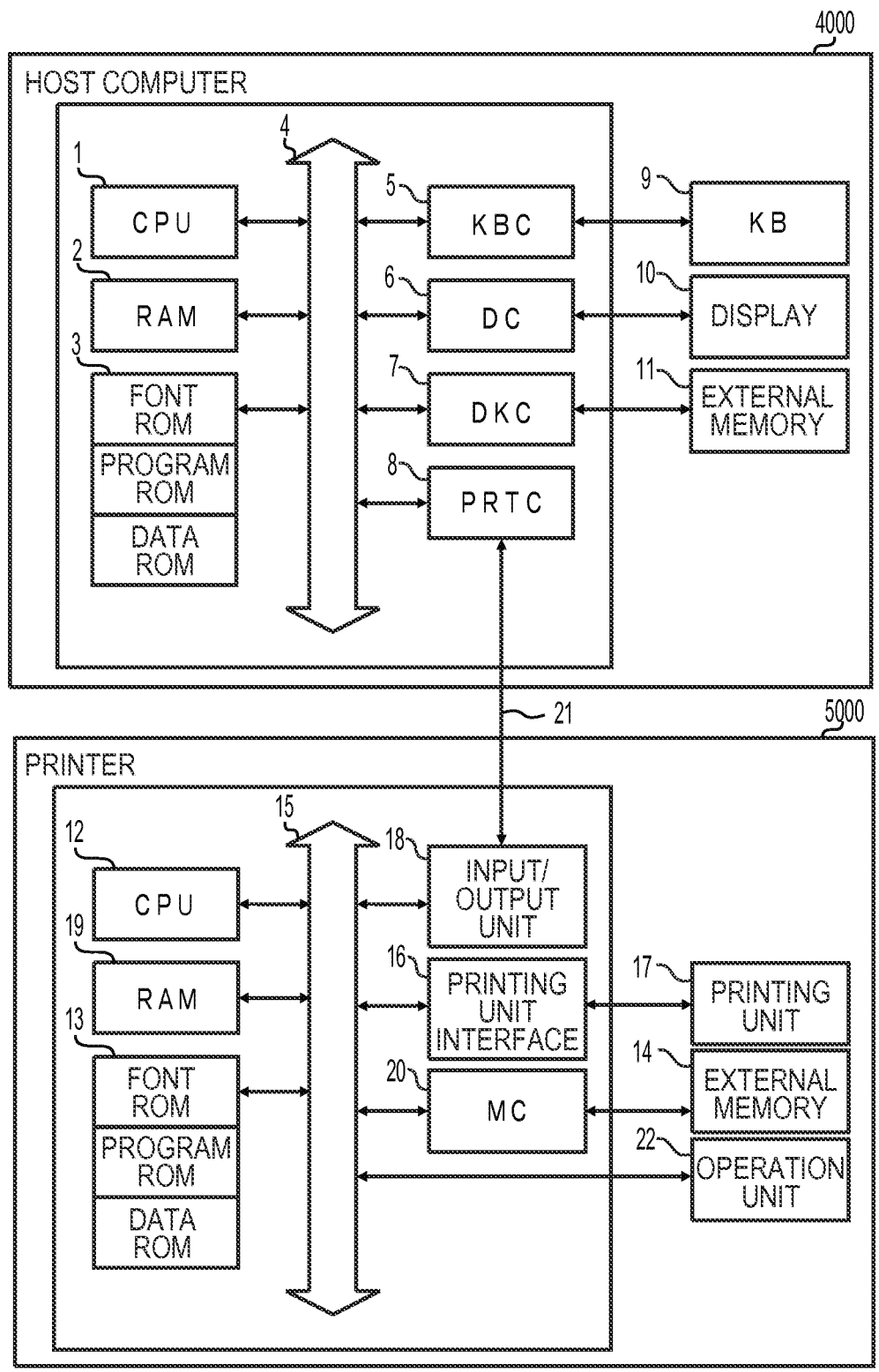
FIG. 2 is a diagram illustrating an example of a hardware construction of a host computer and a printer.

FIG. 2 is a diagram illustrating an example of the hardware construction of the host computer 4000 and the printer 5000.

First, the hardware construction of the host computer 4000 will be described.

A CPU 1 integratedly controls the host computer 4000 and executes processes such as document process, image process, and the like. By executing programs stored in a program ROM of a ROM 3 or an external memory 11, the CPU 1 realizes functions of the host computer 4000, functions of an operating system (hereinbelow, referred to as OS), and flowcharts, which will be described hereinafter.

The program ROM of the ROM 3 or the external memory 11 stores various kinds of programs including a program of the OS serving as a control program of the CPU 1 and the like. A font ROM of the ROM 3 or the external memory 11 stores font data which is used in the document process and the like and stores data which is used in various kinds of processes including the document process.

A RAM 2 functions as a main memory, a work area, or the like of the CPU 1.

A keyboard controller (KBC) 5 controls a key input or the like from an input unit such as keyboard (KB) 9, pointing device, or the like.

A display controller (DC) 6 controls a display of a display 10.

The external memory 11 is a hard disk (HDD) or the like and stores a boot program, various kinds of application programs, font data, a printer control command generating program serving as a program regarding the printer driver, and the like.

The foregoing various kinds of programs may be stored in a storage area of the ROM 3, the external memory 11, or the like as a program file in which the programs have been described.

A disk controller (DKC) 7 controls an access to the external memory 11.

A printer controller (PRTC) 8 is connected to the printer 5000 through an interface 21 and executes communication control with the printer 5000. The CPU 1 executes, for example, a developing (rasterizing) process of outline font into a display information RAM set on the RAM 2, thereby enabling WYSIWYG (What You See Is What You Get) on the display 10 to be performed. The CPU 1 opens various kinds of registered windows and executes various kinds of data processes on the basis of commands instructed by a mouse cursor or the like on the display 10. When instructing the printing, the user opens the window regarding the print settings and can make a setting of the printer and a setting of a print processing method to the printer driver including a selection of a printing mode.

Subsequently, the hardware construction of the printer 5000 will be described.

A CPU 12 integratedly controls the printer 5000. The CPU 12 realizes the functions of the printer 5000 by executing programs stored in a program ROM of a ROM 13 or an external memory 14. The CPU 12 outputs an image signal serving as output information to a printing unit (printer engine) 17 connected to a printing unit I/F 16 through a system bus 15. The CPU 12 can execute a communicating process with the host computer through an input/output unit 18 and can notify the host computer 4000 of information in the printer.

A program ROM of the ROM 13 stores a control program and the like of the CPU 12. A font ROM of the ROM 13 stores font data and the like which are used when the CPU 12 generates output information. A data ROM of the ROM 13 stores information and the like which are used on the host computer 4000 in the case of the printer 5000 without the external memory 14 such as a hard disk or the like.

A RAM 19 is a memory which functions as a main memory, a work area, or the like of the CPU 12 and is constructed in such a manner that a memory capacity can be expanded by an optional RAM which is connected to an expansion port. The RAM 19 is used for an output information developing area, an environment data storage area, an NVRAM, or the like.

The external memory 14 such as hard disk (HDD), IC card, or the like is a memory whose access is controlled by a memory controller (MC) 20. The external memory 14 is connected as an option and stores font data, an emulation program, form data, and the like.

An operation unit 22 has switches which are used for operation on an operation panel, an LED display, and the like. The printer 5000 may have a plurality of optional cards in addition to a built-in font and a plurality of external memories 14 in which a program to interpret printer control languages of different language systems has been stored. The printer 5000 also may have an NVRAM for storing printer mode setting information from the operation unit 22.

Subsequently, the function of the host computer 4000 will be described. It is assumed that a printing apparatus such as a printer 5000 or the like is directly connected to the host computer 4000 or is connected thereto via a network.

FIG. 3 is a diagram illustrating an example of a function construction of the host computer 4000.

When the printing is performed to the printer 5000, an application 301 outputs (draws) print data by using a graphic engine 302.

The graphic engine 302 activates a printer driver 303 and sets an output of the application 301 into the printer driver 303. The graphic engine 302 forms a DDI function from a GDI function received from the application 301 or forms print format data such as XPS or the like and outputs to the printer driver 303. GDI is an abbreviation of Graphic Device Interface. DDI is an abbreviation of Device Driver Interface. XPS is an abbreviation of XML Paper Specification. A series of data received by the printer driver 303 is called "print job". One print job corresponds to one print request.

The printer driver 303 converts the print job received from the graphic engine 302 into a control command, for example, PDL (Page Description Language) or the like which can be recognized by the printer. In this instance, one control command set generated from one print request is called "output job". The printer driver 303 outputs the output job as print data to the printer 5000 through a system spooler 304 and a port monitor 305 via the interface 21.

The port monitor 305 manages an output destination and can switch the output destination in response to an instruction from an outside on the basis of an IP address or the like for identifying a network device.

The host computer 4000 can add the programs regarding the application 301 and the printer driver 303 to the HDD of the external memory 11 through a USB memory or a CD-ROM via the network.

Subsequently, a processing method whereby even if the host computer 4000 does not have the function information of each model as a database, the print setting screen can be uniquely constructed by the configuration settings will be described.

FIG. 4 is a diagram illustrating an example of a setting information list regarding function settings of each of a plurality of prepared device types. The information shown in FIG. 4 is original information of the configuration settings. "device type" mentioned here denotes a type of the printer or the like.

"capability number" 401 is a number allocated to each capability.

"capability" 402 is a name of the capability and corresponds to each capability on display screens of FIGS. 5 to 7, which will be described hereinafter.

"model specific capability" 403 shows whether or not the capability is a model specific capability. For example, since "color mode" is "no", it is not a model specific capability. Since "processing method of paper kind" is "yes", it is a model specific capability.

Items from "standard" 404 to "Production Series" 407 indicate device types. The device types are listed as choices to "device type" 501 or the like in FIG. 5. Each device type becomes the original information of the configuration settings. "maximum capability", "current capability", "model specific capability", and the like are included in the setting information. Details will be described hereinafter with reference to FIGS. 13A to 13F and the like. It is not always necessary that the device types are limited to the device types shown in FIG. 4 and they may be other device types.

Subsequently, the configuration settings will be described.

Figure 5:
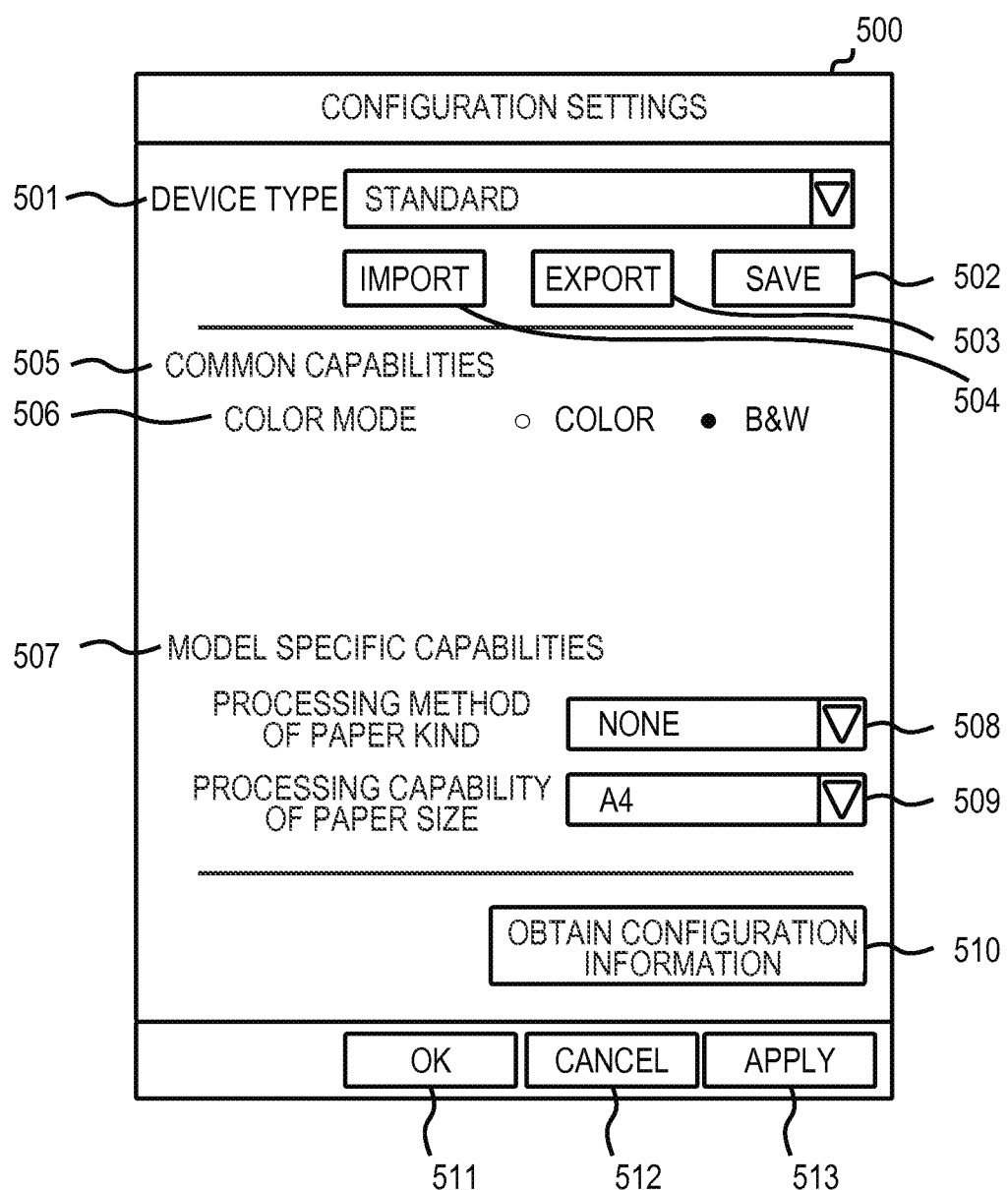
FIG. 5 is a diagram (part 1) illustrating an example of a configuration setting screen.
Figure 6:
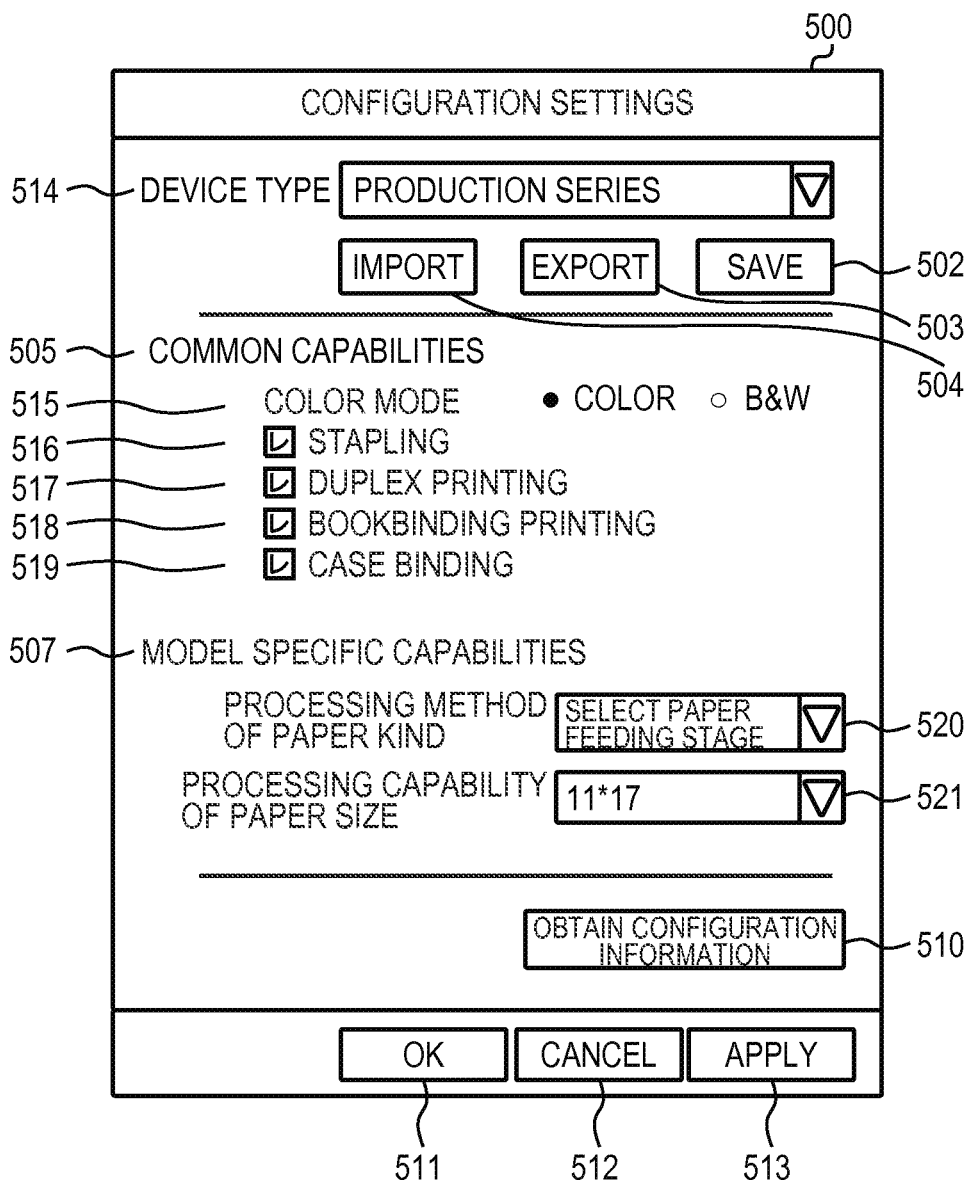
FIG. 6 is a diagram (part 2) illustrating an example of the configuration setting screen.
Figure 7:
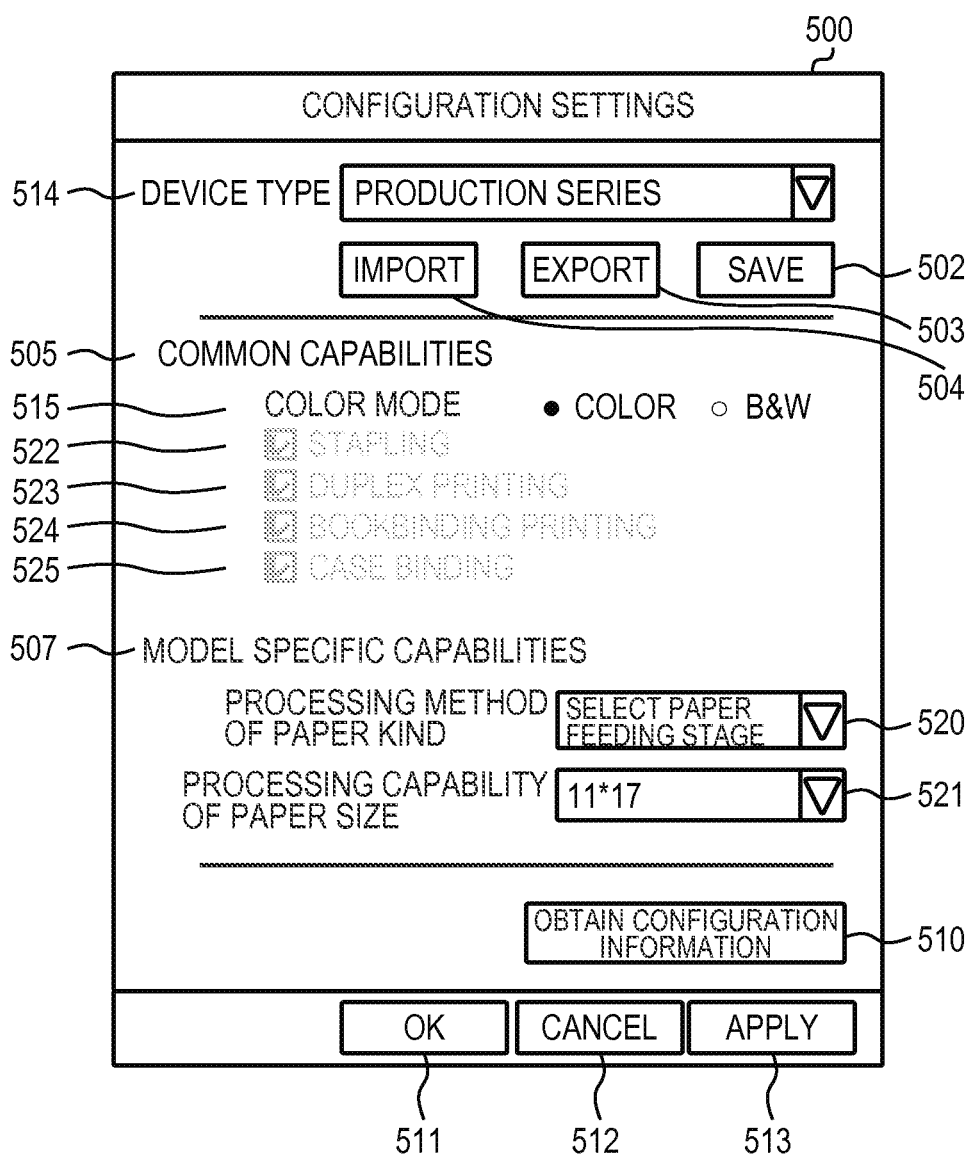
FIG. 7 is a diagram (part 3) illustrating an example of the configuration setting screen.

FIGS. 5 to 7 are diagrams each illustrating an example of a configuration setting screen.

First, the configuration setting screen in FIG. 5 will be described.

"device type" 501 is a display column in which choices of the device types for batch-converting the configuration settings are displayed, and a plurality of device types are listed there. It is now assumed that <standard> as a standard device type has been selected. Therefore, the printer driver 303 constructs a configuration setting screen 500 in FIG. 5 in accordance with the setting information in standard 404 in FIG. 4.

"Import button" 504 is a button to import the batch-conversion setting information. "Export button" 503 is a button to export the batch-conversion setting information.

"Save button" 502 is a button to store the batch-conversion setting information.

"common capabilities" 505 is a group regarding common capabilities and includes "color mode" 506 in which whether the printer is a color printer or a black and white (monochromatic) printer can be selected. It is now assumed that the black and white printer has been selected.

"model specific capabilities" 507 is a group regarding capabilities peculiar to the model and includes "processing method of paper kind" 508 and "processing capability of paper size" 509.

"processing method of paper kind" 508 is a column to set in such a manner that when the user has selected a paper kind such as plain paper, thick paper, OHP, or the like, how it acts in the printer main body. As choices of "processing method of paper kind" 508, there are <none>, <select paper feeding stage>, and <set fixing temperature>. If <select paper feeding stage> has been set, the host computer 4000 generates a print job (command) to select a paper feeding stage in which paper of the paper kind designated by the user was put. If <set fixing temperature> has been set, the host computer 4000 generates a print job to set a fixing mode according to the paper kind. It is now assumed that <none> has been set.

"processing capability of paper size" 509 is a column to display information showing which paper size is supported. It is now assumed that "A4" in which the paper size of A4 or smaller can be supported has been set. Although "processing capability of paper size" 509 is shown by one pull-down in the configuration setting screen 500, it may be constructed in such a manner that the paper size which can be used is set in detail by another display screen.

"configuration information Obtain button" 510 is a button to instruct the host computer 4000 to obtain the configuration information from the printer 5000 as an output target by depressing (selecting) such a button by the user through the input unit. Thus, the user can instruct the host computer 4000 to obtain the configuration information at arbitrary timing. It is assumed that when the device type is switched by the user, the host computer 4000 in the embodiment automatically obtains the configuration information from the printer 5000 as an output target.

An OK button 511 is a button to decide the settings or the like.

A Cancel button 512 is a button to cancel the settings or the like.

An Update button 513 is a button to update the settings or the like.

Subsequently, a configuration setting screen (function setting screen) of FIG. 6 will be described.

A description of portions which are overlapped with those in FIG. 5 is omitted.

It is assumed that <Production Series> as a type of a commercially available printer has been selected in "device type" 514. Therefore, the printer driver 303 constructs the configuration setting screen 500 in FIG. 6 in accordance with the setting information of "Production Series" 407 in FIG. 4.

"common capabilities" 505 include "color mode" 515, "stapling" 516, "duplex printing" 517, "bookbinding printing" 518, and "case binding" 519. It is now assumed that "color" has been selected in "color mode" 515.

In "stapling" 516, the user designates the presence or absence of the stapling function. It is now assumed that the user has designated the presence of the stapling function. If the printer has the stapling function, the user can make advanced settings such as stapling position, the number of times of stapling, and the like.

In "duplex printing" 517, the user designates the presence or absence of the duplex printing function. It is now assumed that the user has designated the presence of the duplex printing function.

In "bookbinding printing" 518, the user designates the presence or absence of the bookbinding printing function. It is now assumed that the user has designated the presence of the bookbinding printing function.

In "case binding" 519, the user designates the presence or absence of the case binding function. It is now assumed that the user has designated the presence of the case binding printing function.

In "processing method of paper kind" 520, it is assumed that <select paper feeding stage> has been selected.

In "processing capability of paper size" 521, it is assumed that "11*17" in which the paper size of 11*17 inches or less can be supported has been set.

Subsequently, a configuration setting screen in FIG. 7 will be described.

A description of portions which are overlapped with those in FIGS. 5 and 6 is omitted.

It is assumed that <Production Series> has been selected in "device type" 514 in a manner similar to FIG. 6. Therefore, the printer driver 303 constructs the configuration setting screen 500 in FIG. 7 in accordance with the setting information of "Production Series" 407 in FIG. 4.

"common capabilities" 505 includes "color mode" 515, "stapling" 522, "duplex printing" 523, "bookbinding printing" 524, and "case binding" 525. It is now assumed that as a result of that the host computer 4000 obtained the configuration information from the printer 5000, it is determined that several capabilities included in "common capabilities" 505 are not provided for the printer 5000. In such a case, the host computer 4000 grayout-displays setting items as illustrated in FIG. 6 so as to disable the user to set the capabilities other than the setting targets which are not equipped for the printer 5000.

Subsequently, a print setting screen corresponding to the configuration setting screen will be described.

An example in which the printer driver 303 constructs a print setting screen on the basis of the configuration settings in FIGS. 5 to 7 will be described with reference to FIGS. 8 to 10.

Figure 8:
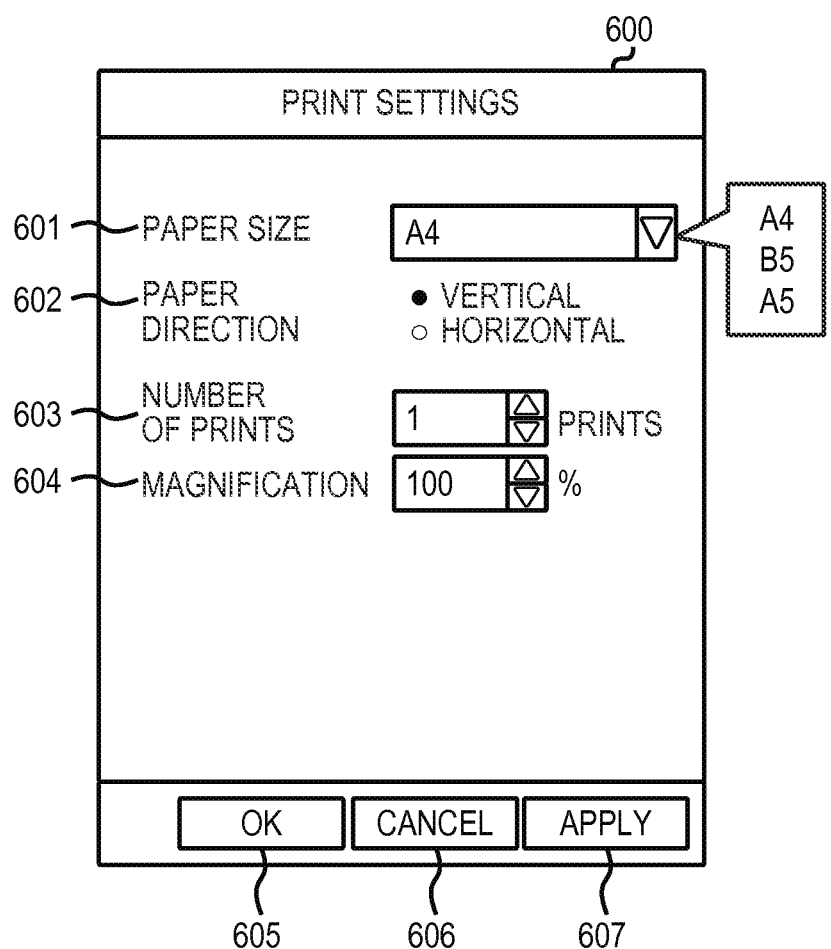
FIG. 8 is a diagram (part 1) illustrating an example of a print setting screen.
Figure 9:
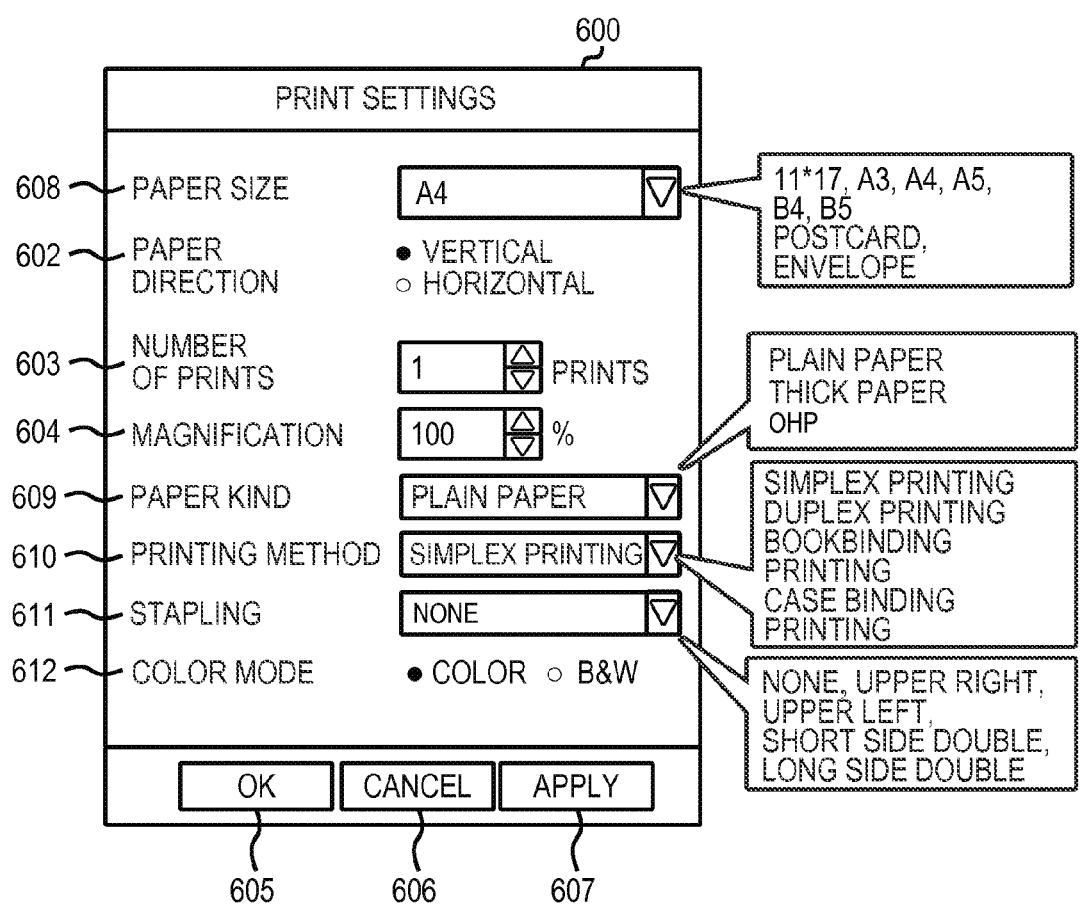
FIG. 9 is a diagram (part 2) illustrating an example of the print setting screen.
Figure 10:
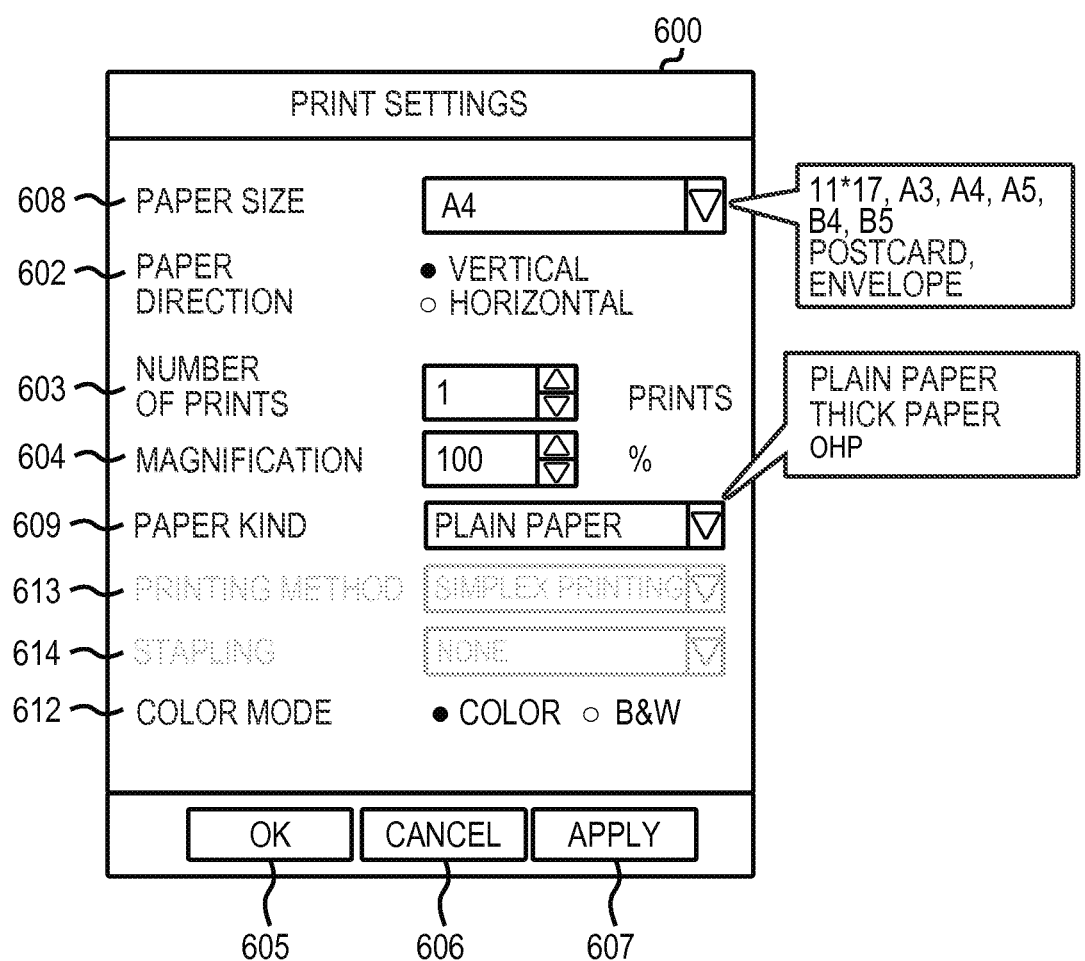
FIG. 10 is a diagram (part 3) illustrating an example of the print setting screen.

FIGS. 8 to 10 are diagrams illustrating examples of the print setting screen. The print setting screens in FIGS. 8 to 10 correspond to the configuration setting screens in FIGS. 5 to 7, respectively.

First, the print setting screen in FIG. 8 will be described.

In "paper size" 601, the user selects a paper size at the time of executing the printing. In "paper size" 601, <A4>, <A5>, and <B4> are listed in accordance with "processing capability of paper size" 509 in FIG. 5.

In "paper direction" 602, the user selects "vertical" or "horizontal" as a direction of the paper.

In "number of prints" 603, the user sets the number of prints.

In "magnification" 604, the user sets a magnification of the printing.

It is assumed that the three items of "paper direction" 602, "number of prints" 603, and "magnification" 604 are always displayed irrespective of the setting state of the configuration setting screen.

An OK button 605, a Cancel button 606, and an Update button 607 are buttons which are depressed by the user at the time of deciding the settings, cancelling the settings, and updating the settings, respectively.

If the black and white printer has been selected in "color mode" 506 in FIG. 5, print setting items regarding the selection of the color mode do not exist in the corresponding print setting screen.

Subsequently, the print setting screen in FIG. 9 will be described.

A description of portions which are overlapped with those in FIG. 8 is omitted.

In "paper size" 608, <11*17>, <A3>, <A4>, <A5>, <B4>, <B5>, <postcard>, and <envelope> are listed in accordance with "processing capability of paper size" 521 in FIG. 6.

"paper kind" 609 is valid-displayed because <select paper feeding stage> has been selected in "processing method of paper kind" 520 in FIG. 6. As choices, <plain paper>, <thick paper>, <OHP>, and the like are listed in "paper kind" 609.

In "printing method" 610, <simplex printing>, <duplex printing>, <bookbinding printing>, and <case binding printing> are listed in accordance with the contents in a range from "duplex printing" 517 to "case binding" 519 in FIG. 6.

In "stapling" 611, the positions where the stapling can be performed are listed in accordance with results of the contents of "stapling" 516 in FIG. 6 and the contents of advanced settings of the stapling. In this instance, <none>, <upper right>, <upper left>, <short side double>, and <long side double> are listed in "stapling" 611.

In "color mode" 612, choices of "color" and "black and white" are displayed in accordance with the contents of "color mode" 515 in FIG. 6. In the case of a printer which can perform the color printing, since the user can also select the black and white printing, if "color" is set as "color mode" 515 on the configuration setting screen, choices of "color" and "black and white" are displayed on the print setting screen.

Subsequently, the print setting screen in FIG. 10 will be described.

A description of portions which are overlapped with those in FIGS. 8 and 9 is omitted.

"printing method" 613 is grayout-displayed in accordance with the contents in a range from "duplex printing" 523 to "case binding" 525 in FIG. 8.

"stapling" 614 is grayout-displayed in accordance with the contents of "stapling" 522 in FIG. 8. Since the print setting items corresponding to the items which are grayout-displayed in the configuration setting screen in this manner are items which must not be set on the print setting screen, they are grayout-displayed so that the user cannot change them.

As mentioned above, the user selects the device type and makes the configuration settings, so that the host computer 4000 uniquely constructs the print setting screen. Thus, the user can easily make the print settings to an arbitrary printer. That is, if the user properly sets the capabilities by the configuration settings, the host computer 4000 can provide a suitable print setting environment even to a printer having unknown specifications which will be put on sale in future. However, if the user does not select the device type suitable for the printing device connected to the host computer 4000, the configuration setting screen as illustrated in FIG. 7 is displayed and the print setting screen as illustrated in FIG. 10 is displayed. That is, the items which cannot be used by the user are grayout-displayed.

It is now assumed that, for example, in the case where the host computer 4000 is connected to the printer 5000 having the stapling function, the user has made the configuration settings as illustrated in FIG. 5. In this case, even if the host computer 4000 obtains the configuration information of the printer 5000, the print setting screen as illustrated in FIG. 8 is displayed and such a problem that the user cannot use the stapling function occurs. That is, if the user does not select the suitable device type, the setting items are grayout-displayed and the functions which cannot be used occur. Thus, such a problem that the setting screen is difficult to be seen, wasteful print settings are displayed, or the functions which cannot be used at all are displayed can occur.

The method whereby the host computer 4000 uniquely constructs the print setting screen by the configuration settings made by the user has been described as mentioned above. However, in the case of the above method, it is necessary that the user selects the proper device type and makes the proper configuration settings.

A method whereby the foregoing problems are improved and even if the host computer 4000 does not have the function information of each model as a database, the print setting screen is uniquely constructed by the configuration settings will be described hereinbelow.

First, in the system configuration in FIG. 1, it is now assumed that the printer 5000(*a*) is a monochromatic printer which can perform the A4 printing and can perform the stapling. In this case, it is desirable that the configuration setting screen 500 becomes a screen as illustrated in FIG. 11A and a print setting screen 600 becomes a screen as illustrated in FIG. 12.

In the system configuration in FIG. 1, it is also assumed that the printer 5000(*a*) is a color printer which can perform the printing of 11*17 inches and can perform the stapling, duplex printing, bookbinding printing, and case binding. In this case, it is desirable that the configuration setting screen 500 becomes the screen as illustrated in FIG. 6 and the print setting screen 600 becomes the screen as illustrated in FIG. 9.

As a difference between the foregoing two examples, there is a difference of only the capabilities provided for the printer 5000(*a*). According to a method which will be described hereinbelow, the host computer 4000 can reconstruct the configuration setting screen 500 or the print setting screen 600 in accordance with the capabilities of the printer by similar processes even in any one of the foregoing cases.

Figure 11:
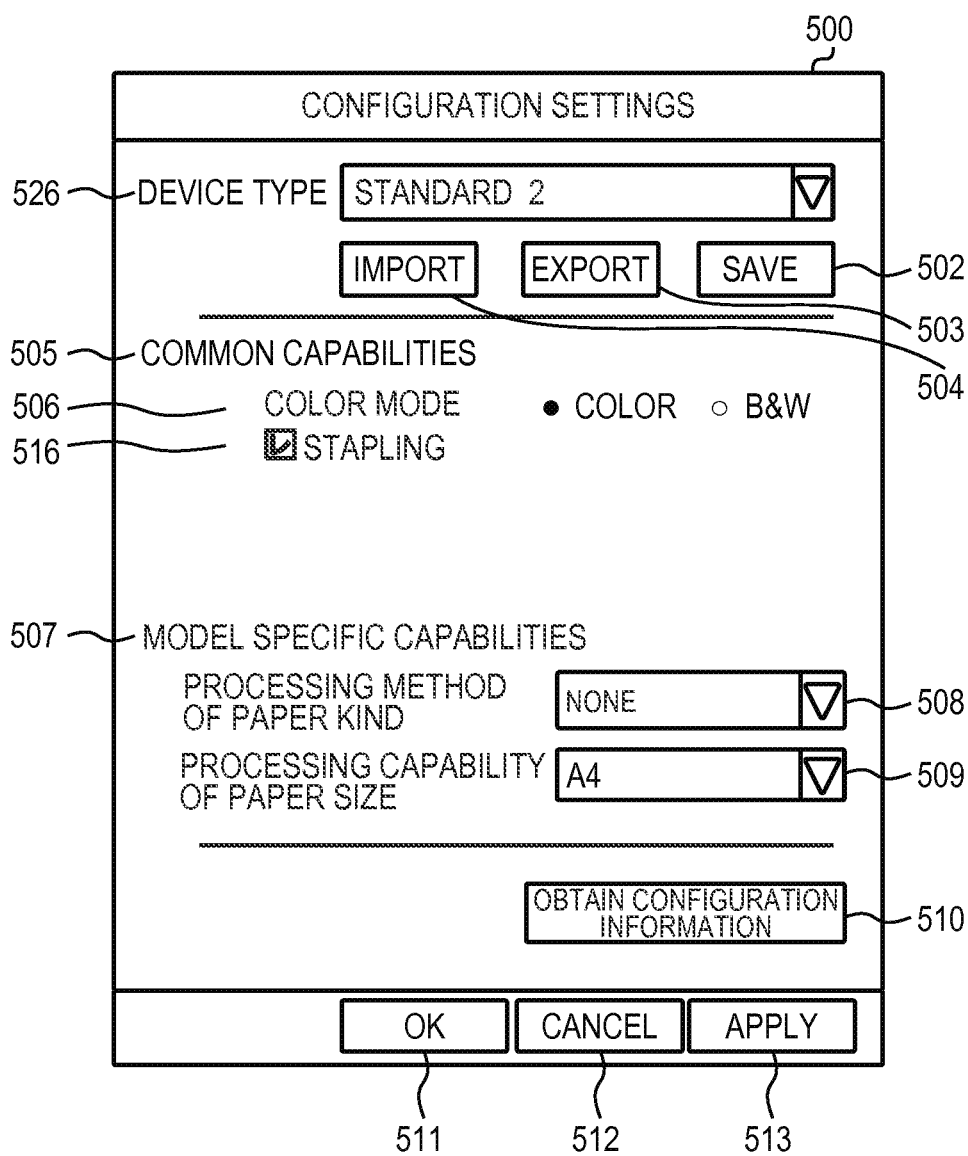
FIGS. 11A and 11B are diagrams (part 4) illustrating examples of the configuration setting screen.
Figure 12:
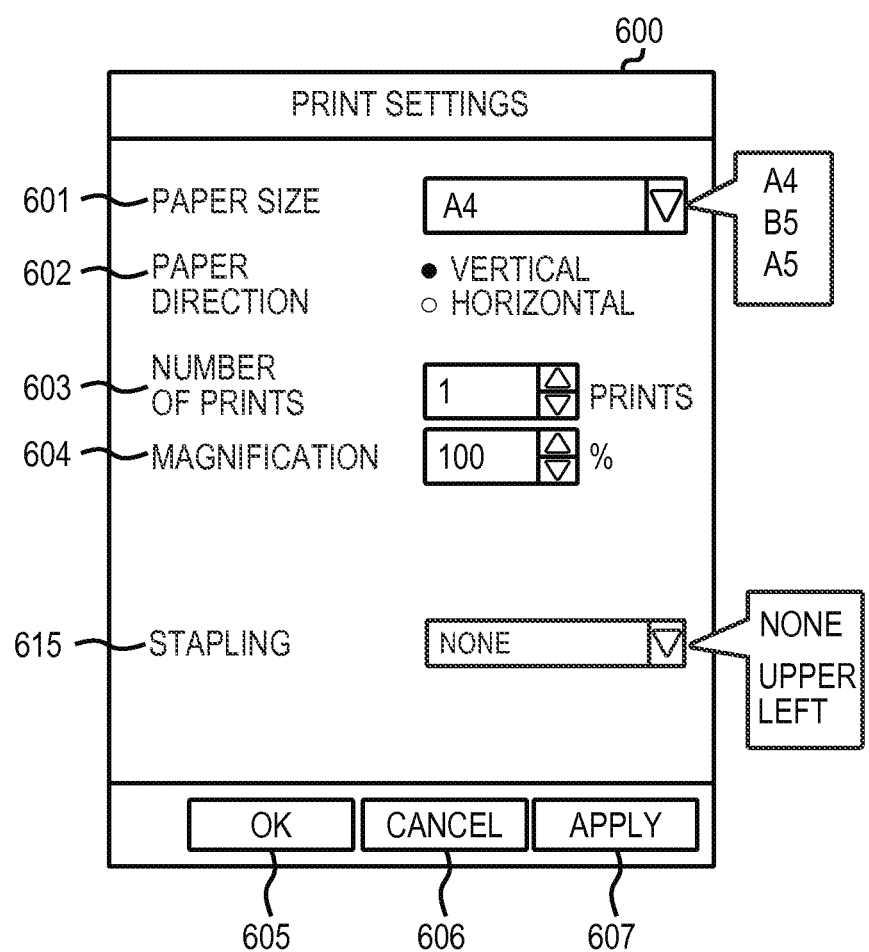
FIG. 12 is a diagram (part 4) illustrating an example of the print setting screen.

Although the black and white setting in "color mode" 506 and the settings regarding "stapling" 516 which are the settings necessary in the printer 5000(*a*) are included in the configuration setting screen 500 in FIG. 11A, the common capabilities which are unnecessary for the settings of the printer 5000(*a*) are not included. Therefore, in the configuration setting screen 500 in FIG. 12, only "stapling" 615 exists in the settings regarding the common capabilities. That is, the print setting screen 600 in FIG. 12 is constructed only by the setting items which are necessary in the settings of the printer 5000(*a*).

With respect to the configuration setting screen 500 in FIG. 11A, a description of portions which are overlapped with those in FIGS. 5 to 7 is omitted. With respect to the print setting screen 600 in FIG. 12, a description of portions which are overlapped with those in FIGS. 8 to 10 is omitted.

FIGS. 13A to 13F are diagrams illustrating examples of device type information regarding the function settings of the device type in FIG. 4 stored in the external memory 11.

Device type information 901 is device type information corresponding to the case where the device type is "standard" 404 in FIG. 4. Details of the device type information 901 will now be described hereinbelow. A header portion is CNDevTypeP. This is an example of an identifier showing that it is device type information of a pre-installation type which has been prepared and whose updating is not permitted. A device type name is "standard".

In the color mode, B & W (black and white)=1 and Color=0 and it is shown that the color mode is B & W.

The paper size capability is A4 Type and the paper which can be actually used by the user is A5, B5, and A4 paper.

In the case of the example of the device type information 901, the maximum capability is the color mode and the paper size capability. The current capability is B & W of the color mode and any one of the paper size capabilities. It is now assumed that the paper size capability is A4. A configuration setting screen corresponding to the contents of the device type information 901 is the configuration setting screen in FIG. 5 mentioned above.

Device type information 902 is device type information corresponding to the case where the device type is "SFP Series" 405 in FIG. 4. Device type information 903 is device type information corresponding to the case where the device type is "MFP Series" 406 in FIG. 4. Device type information 904 is device type information corresponding to the case where the device type is "Production Series" 407 in FIG. 4.

Although a detailed description of the device type information 902 to 904 is omitted, the maximum capability changes in accordance with the definition contents as already described by using the device type information 901.

A header portion of each of device type information 905 and 906 is CNDevTypeD. It is an example of an identifier showing that the device type information is device type information of a device type called "derived type" which is generated by the host computer 4000. The device type information of the derived type mentioned here is the device type information which was derived and generated by the host computer 4000 by using the device information of the pre-installation type as a base. Details will be described hereinlater with reference to FIG. 17 and the like. The host computer 4000 can update the device information of the derived type and store its contents.

The device type information 901 to 906 may be stored into the external memory 11 as independent files (data) or as one file in which all of them are collected.

Figure 14:
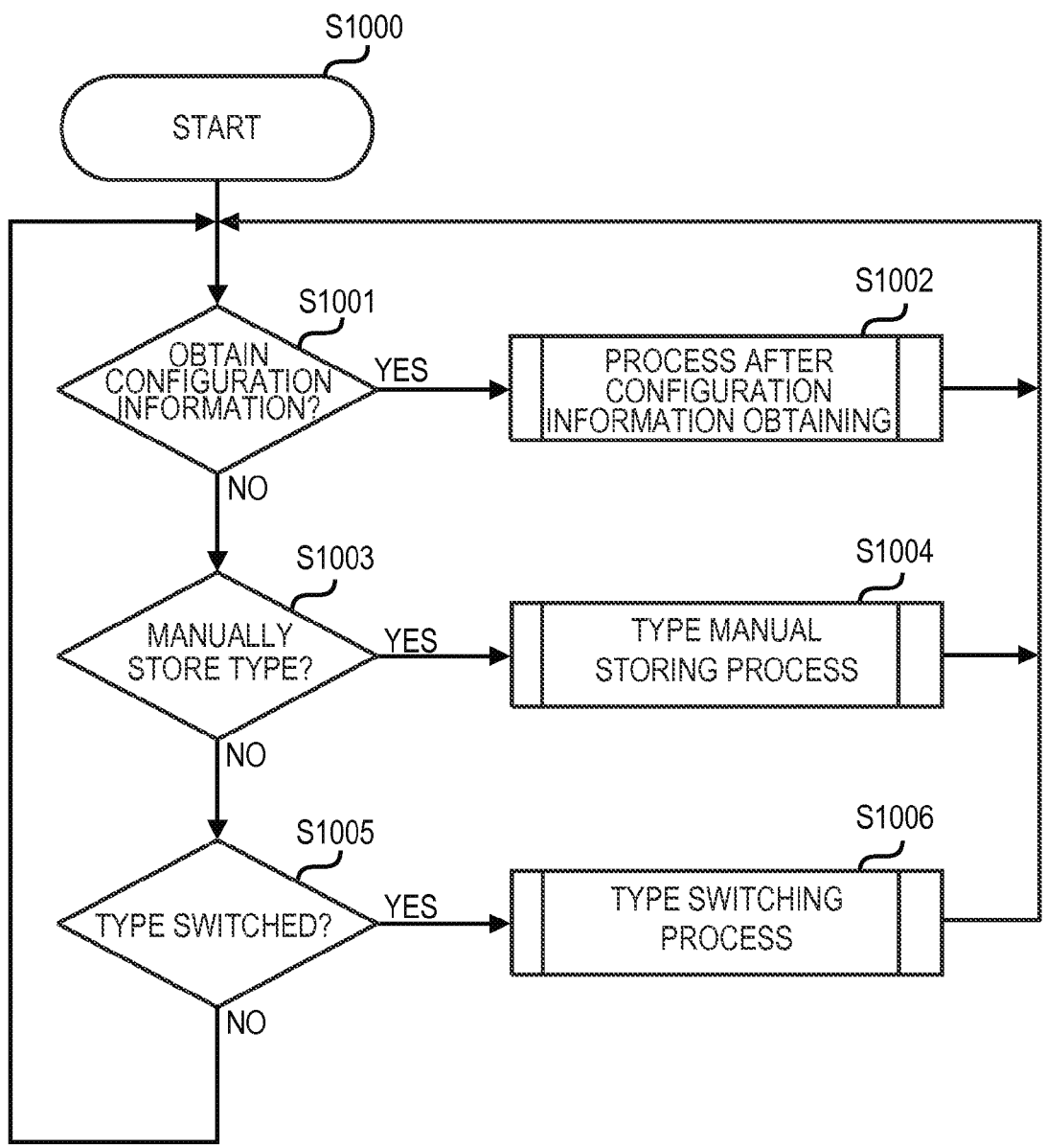
FIG. 14 is a flowchart showing an example of a process in an embodiment 1.

FIG. 14 is a flowchart showing an example of a process of the host computer 4000 in the embodiment. The process in the embodiment is executed as a thread which operates in parallel on the OS of the host computer 4000.

In S1000, the printer driver 303 starts the process of FIG. 14.

In S1001, the printer driver 303 discriminates whether or not the configuration information is obtained. If it is determined that the configuration information is obtained, the processing routine advances to S1002. If it is determined that the configuration information is not obtained, S1003 follows. It doesn't matter whether the printer driver 303 has detected that the user depressed the configuration information Obtain button 510 by the manual operation and tried to obtain the configuration information or the printer driver 303 has tried to automatically obtain the configuration information at the time of switching the device type. The former is called "manually obtain" and the latter is called "automatically obtain" hereinbelow.

Details of the process of S1002 will be described hereinafter with reference to FIG. 15.

In S1003, the printer driver 303 discriminates whether or not the Save button 502 has been depressed in order to manually store the device type. If it is decided that the Save button 502 has been depressed, S1004 follows. If it is decided that the Save button 502 is not depressed, S1005 follows.

Details of the process of S1004 will be described hereinlater with reference to FIG. 16.

In S1005, the printer driver 303 discriminates whether or not the device type has been switched. If it is decided that the device type has been switched, S1006 follows. If it is decided that the device type is not switched, the processing routine is returned to S1001. There are the following four kinds of switching patterns: that is, the device type is switched from the type of the pre-installation type to a type of another pre-installation type; it is switched from the type of the pre-installation type to the derived type; it is switched from the derived type to the type of the pre-installation type; and it is switched from the derived type to another derived type.

Details of the process of S1006 will be described hereinafter with reference to FIG. 17.

It is not always necessary that the printer driver 303 executes all of the processes of S1001, S1003, and S1005. For example, the printer driver 303 may execute one or an arbitrary plurality of processes among the processes of S1001, S1003, and S1005.

Figure 15:
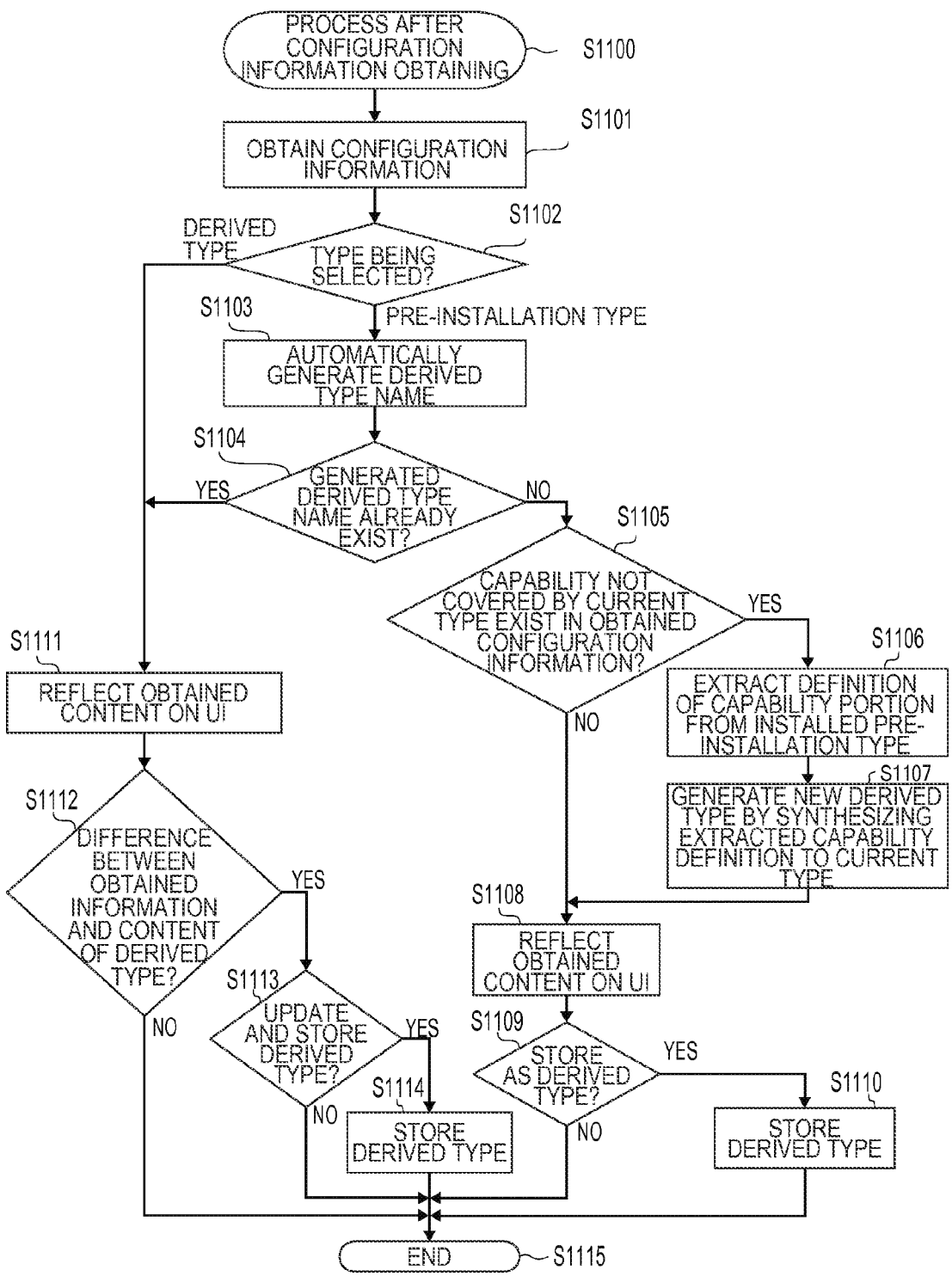
FIG. 15 is a flowchart showing an example of a process after configuration information obtainment.

FIG. 15 is a flowchart showing an example of a process after the configuration information obtainment. In the process of FIG. 15, the printer driver 303 obtains the configuration information from the printer 5000(*a*) and automatically generates and updates the derived type in accordance with necessity.

In S1100, the printer driver 303 starts the process of FIG. 15.

In S1101, the printer driver 303 transmits a request of the configuration information to the printer 5000(*a*) connected to the host computer 4000 and obtains the configuration information as its return value from the printer 5000(*a*). As configuration information, the printer driver 303 can obtain the configuration information regarding at least the color mode, stapling, duplex printing, bookbinding printing, and case binding. In the case of the printer 5000(*a*) which is now assumed as a monochromatic printer which can perform the A4 printing and the stapling, the printer driver 303 can obtain the configuration information of (color mode=black and white) and (stapling, upper left=1).

In S1102, the printer driver 303 discriminates whether or not the device type being selected on the configuration setting screen is the pre-installation type or the derived type. If it is determined that the device type is the pre-installation type, S1103 follows. If it is determined that the device type is the derived type, the printer driver 303 advances to S1111.

In S1103, the printer driver 303 automatically generates a derived type name by using the device type information of "device type" 501 being selected on the configuration setting screen as a base. For example, in the case of FIG. 5, since "device type" 501 is <standard>, the printer driver 303 may generate such a name, as a derived type name, that one character has been added to the type name <standard> serving as a base like <standard 2> or the like. However, it is not always necessary to limit the derived type name generated by the printer driver 303 to the foregoing name.

In S1104, the printer driver 303 discriminates whether or not the device type information (file) of the derived type name generated in S1103 already exists in the external memory 11. If it is determined that the device type information (file) already exists, S1111 follows. If it is determined that the device type information (file) does not exist, the printer driver 303 advances to S1105.

In S1105, the printer driver 303 discriminates whether or not a capability which is not covered by "device type" 501 being selected at present on the configuration setting screen exists in the contents (function information) of the configuration information obtained in S1101. If it is determined that such a capability exists, the printer driver 303 advances to S1106. If it is determined that such a capability does not exist, the printer driver 303 advances to S1108.

In the case of the printer 5000(a) which is now assumed as a monochromatic printer which can perform the A4 printing and the stapling, the printer driver 303 can obtain the configuration information of (color mode=black and white) and (stapling, upper left=1). On the other hand, the function in the case of (device type=<standard>) is only (color mode=black and white). That is, the capability of (stapling, upper left=1) does not exist in (device type=<standard>) being selected at present on the configuration setting screen. In such a case, the printer driver 303 determines that the capability which is not covered by "device type" 501 being selected at present on the configuration setting screen exists in the contents of the configuration information obtained in S1101.

In S1106, the printer driver 303 searches for the device type information in which (stapling, upper left) has been defined in the device type information 901 to 904 in FIGS. 13A to 13D as a type of the pre-installation type stored in the external memory 11. In the case of the embodiment, as a result of the search, the printer driver 303 determines that a definition of (stapling, upper left) exists in the device type information 902 to 904. The printer driver 303 extracts the definition information of (stapling, upper left) from, for example, the device type information 902. The printer driver 303 may extract the definition information of (stapling, upper left) from the device type information 903 or 904 instead of the device type information 902.

In S1107, the printer driver 303 synthesizes the definition information of (stapling, upper left) extracted in S1106 to the device type information of <standard> as a device type being selected at present, thereby generating device type information of <standard 2> as a new derived type. Thus, the printer driver 303 can generate new device type information which can cover the functions shown by the configuration information obtained in S1101.

In S1108, the printer driver 303 updates the configuration setting screen 500 in FIG. 5 by the device type information of the new derived type generated in S1107 or by the device type information being selected at present which was confirmed in S1105. In this instance, as a result of the obtainment of the configuration information, if it is determined that the capability which is not provided for the printer exists although it is not defined in the device type information, the printer driver 303 grayout-displays the items of the capability. As a result of the process of S1108, the printer driver 303 displays the configuration setting screen 500 in FIG. 11A.

In S1109, the printer driver 303 discriminates whether or not the device type information of the derived type of <standard 2> is stored in response to an instruction of the user received through the input unit. If it is determined that the device type information is stored, S1110 follows. If it is determined that the device type information is not stored, the printer driver 303 advances to S1115. At this time, the printer driver 303 may display a confirmation screen onto the display 10 and receive a user's instruction. The printer driver 303 may automatically make such a discrimination on the basis of confirming switch (data) for changing over a switch in accordance with whether or not a predetermined condition stored in the external memory 11 is satisfied.

In S1110, the printer driver 303 stores the device type information of the derived type generated in S1107 into the external memory 11. The device type information of the derived type which is stored by the printer driver 303 in S1110 has a structure like, for example, the device type information 905 in FIG. 13E. In the device type information 905, a header is CNDevTypeD and indicates that the device type is the derived type. A type name is <standard 2>. The device type information 905 is the device type information of the derived type added to the device type information 901 in which the definition information of (stapling, none=1, upper left=0) is <standard>.

By the above processes, the printer driver 303 can automatically generate the device type information of the derived type <standard 2> to which the stapling information has been added by using the device type information of the <standard> type as a base. That is, on the basis of the device type information being selected and serving as a base, the printer driver 303 can newly generate proper device type information which can cover the functions of the printer 5000.

Subsequently, processes in S1111 and subsequent steps will be described.

As mentioned above, as a result of the discrimination of S1102, if it is determined that the device type being selected on the configuration setting screen is the derived type, the printer driver 303 advances to S1111. In this case, the printer driver 303 has stored the device type information of the derived type in S1110 prior to executing the process of S1111 and is executing the obtainment of the configuration information in a state where such a device type has been selected on the configuration setting screen. In S1111, the printer driver 303 reflects the contents of the obtained configuration information onto the configuration setting screen 500.

As a result of the discrimination of S1104, if it is also determined that the device type information of the generated derived type name already exists, the printer driver 303 has stored the device type information of the derived type in S1110 prior to executing the process of S1111. Further, the device type of the pre-installation type serving as a source of the device type information of the derived type has been selected at present on the configuration setting screen. In this case, the printer driver 303 reflects the contents of the obtained configuration information onto the contents of the device type information of the derived type and displays the configuration setting screen 500.

In any one of the above cases, as a result of the obtainment of the configuration information, if it is determined that the capability which is not provided for the printer although it has been defined in the device type information exists, the printer driver 303 grayout-displays the setting items of the capability.

In S1112, the printer driver 303 discriminates whether or not there is a difference between, for example, the device type information 905 in FIG. 13E serving as contents of the device type information of the derived type and the contents of the configuration setting screen 500. If it is determined that there is a difference, the printer driver 303 advances to S1113. If it is determined that there is not a difference, the printer driver 303 advances to S1115. For example, a difference can occur in the case where the stapling function is uninstalled from the printer 5000(a) after the printer driver 303 stored the device type information 905 of the derived type into the external memory 11 in S1110, or the like.

In S1113, the printer driver 303 discriminates whether or not the contents of the difference are reflected and the device type information of the derived type is updated and stored. If it is determined that the device type information is updated and stored, S1114 follows. If it is determined that the device type information is not updated and stored, the printer driver 303 advances to S1115. It is assumed that a discriminating method is similar to that in S1109.

In S1114, the printer driver 303 stores the updated device type information of the derived type into the external memory 11 and advances to S1115.

In S1115, the printer driver 303 finishes the process of FIG. 15.

By the above processes, if the device type information of the derived type exists, the printer driver 303 can execute the updating process in accordance with necessity.

How the print setting screen of FIG. 12 changes in correspondence to the configuration setting screen 500 in FIG. 11A mentioned above will now be described. "stapling" 615 in FIG. 12 is a print setting item corresponding to "stapling" 516 in FIG. 11A. As choices of "stapling" 615, there are <none> and <upper left>. A description of portions which are overlapped with those in FIGS. 8 to 10 is omitted.

Figure 16:
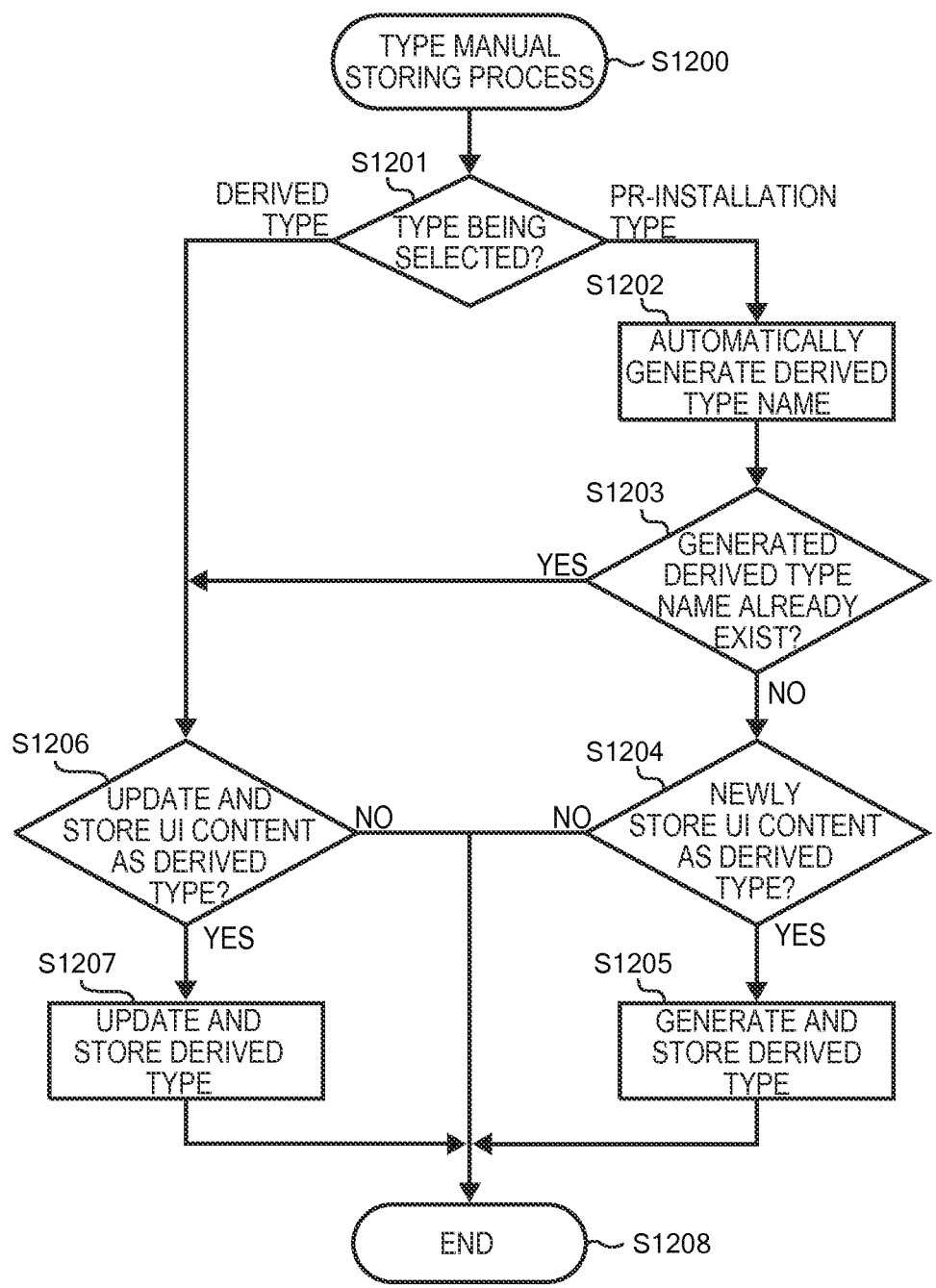
FIG. 16 is a flowchart showing an example of a type manual storing process.

FIG. 16 is a flowchart showing an example of a type manual storing process.

In S1200, when it is detected that the "Save button" 502 of the configuration setting screen 500 was depressed by the user, the printer driver 303 starts the process of FIG. 16.

In S1201, the printer driver 303 discriminates whether or not the device type being selected on the configuration setting screen is the derived type or the pre-installation type. If it is determined that the device type is the derived type, the printer driver 303 advances to S1206. If it is determined that the device type is the pre-installation type, the printer driver 303 advances to S1202.

Since a process of S1202 is similar to that of S1103, its description is omitted.

Since a process of S1203 is similar to that of S1104, its description is omitted.

In S1204, the printer driver 303 discriminates whether or not the contents of the configuration setting screen 500 can be newly generated and stored as device type information of the derived type. If it is determined that the device type information can be newly generated and stored, S1205 follows. If it is determined that the device type information must not be newly generated and stored, the printer driver 303 advances to S1208. It is assumed that a discriminating method is similar to that in S1109.

In S1205, the printer driver 303 generates device type information of the derived type and stores into the external memory 11. The device type information of the derived type which is generated here by the printer driver 303 has a structure like, for example, the device type information 905 in FIG. 13E. A header of the device type information 905 is CNDevTypeD and shows that the device type is the derived type.

By the foregoing processes, in the case where the device type information of the derived type was generated and stored when the pre-installation type has been selected, the printer driver 303 can generate the device type information of the derived type having substantially the same contents as those of the device type information of the pre-installation type.

Subsequently, processes in S1206 and subsequent steps will be described.

As mentioned above, as a result of the discrimination of S1201, if it is determined that the device type being selected on the configuration setting screen is the derived type, the printer driver 303 advances to S1206. In this case, the printer driver 303 detected that it has stored the device type information of the derived type in S1110 prior to executing the process of S1206 and that the Save button 502 has been depressed in a state where such a device type was selected on the configuration setting screen. In S1206, the printer driver 303 discriminates whether or not the contents of the configuration setting screen 500 can be updated and stored as device type information of the derived type. If it is determined that the device type information can be updated and stored, S1207 follows. If it is determined that the device type information must not be updated and stored, the printer driver 303 advances to S1208. It is assumed that a discriminating method is similar to that in S1109.

In S1207, the printer driver 303 updates the device type information of the derived type and stores into the external memory 11. In this instance, the printer driver 303 updates and stores, for example, data such as device type information 905 in FIG. 13E.

In S1208, the printer driver 303 finishes the process of FIG. 16.

By the foregoing processes, if the storage is executed when the derived type has been selected, the printer driver 303 can update and store the contents of the configuration setting screen 500 as device type information of the derived type.

Figure 17:
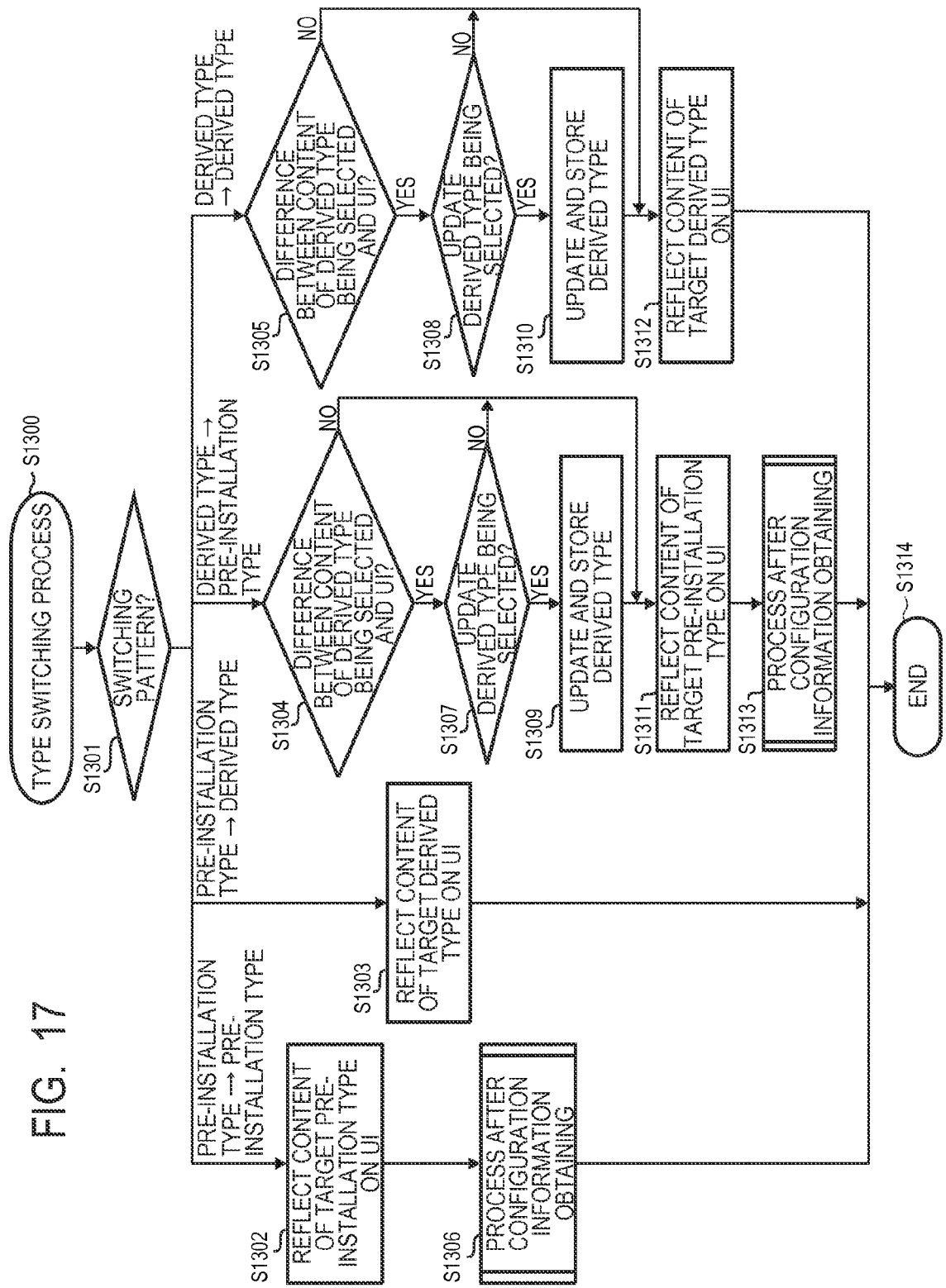
FIG. 17 is a flowchart (part 1) showing an example of a type switching process.

FIG. 17 is a flowchart showing an example of a type switching process.

In S1300, the printer driver 303 starts a process of FIG. 17.

In S1301, the printer driver 303 discriminates a switching pattern. If it is determined that the device type has been switched from the pre-installation type to the pre-installation type, the printer driver 303 advances to S1302. If it is determined that the device type has been switched from the pre-installation type to the derived type, the printer driver 303 advances to S1303. If it is determined that the device type has been switched from the derived type to the pre-installation type, the printer driver 303 advances to S1304. If it is determined that the device type has been switched from the derived type to the derived type, the printer driver 303 advances to S1305.

In S1302, the printer driver 303 updates all of the contents of the configuration setting screen 500 by the contents of the pre-installation type (target pre-installation type) which was newly selected. In the case of the pre-installation type, the capabilities of the connected printer 5000(*a*) cannot be always and completely covered as they are. Therefore, in S1306, the printer driver 303 executes the process described in FIG. 15 in accordance with necessity and automatically generates device type information of the derived type.

In S1303, the printer driver 303 updates all of the contents of the configuration setting screen 500 by the contents of the derived type (target derived type) which was newly selected. Since the newly selected type is the derived type here, the printer driver 303 does not execute the process shown in FIG. 15.

In S1304, the printer driver 303 discriminates whether or not there is a difference between the contents of the device type information of the derived type being selected (before it is changed) and the contents of the configuration setting screen 500. If it is determined that there is a difference, S1307 follows. If it is determined that there is not a difference, the printer driver 303 advances to S1311.

In S1307, the printer driver 303 discriminates whether or not the device type information of the derived type being selected (before it is changed) is updated and stored. If it is determined that the printer driver 303 updates and stores the device type information, S1309 follows. If it is determined that the printer driver 303 does not update and store the device type information, S1311 follows. It is assumed that a discriminating method is similar to that in S1109.

In S1309, the printer driver 303 updates the device type information of the derived type being selected (before it is changed) in accordance with the setting contents of the configuration setting screen and stores.

In S1311, the printer driver 303 updates all of the contents of the configuration setting screen 500 by the contents of the pre-installation type (target pre-installation type) which was newly selected. In the case of the pre-installation type, the capabilities of the connected printer 5000(a) cannot be always and completely covered as they are. Therefore, in S1313, the printer driver 303 executes the process described in FIG. 15 in accordance with necessity and automatically generates device type information of the derived type.

In S1305, the printer driver 303 discriminates whether or not there is a difference between the contents of the device type information of the derived type being selected (before it is changed) and the contents of the configuration setting screen 500. If it is determined that there is a difference, S1308 follows. If it is determined that there is not a difference, the printer driver 303 advances to S1312. In such a case where the user does not manually change and store the setting contents of the configuration setting screen, the printer driver 303 executes the process of S1305.

In S1308, the printer driver 303 discriminates whether or not the device type information of the derived type being selected (before it is changed) is updated and stored. If it is determined that the printer driver 303 updates and stores the device type information, S1310 follows. If it is determined that the printer driver 303 does not update and store the device type information, S1312 follows. It is assumed that a discriminating method is similar to that in S1109.

In S1310, the printer driver 303 updates the device type information of the derived type being selected (before it is changed) in accordance with the setting contents of the configuration setting screen and stores.

In S1312, the printer driver 303 updates all of the contents of the configuration setting screen 500 by the contents of the derived type (target derived type) which was newly selected. In this instance, since the device type which was newly selected is the derived type, the printer driver 303 does not execute the process as shown in FIG. 15.

By the above processes, in association with the switching of the device type, while coping with such a situation that the user forgot the storage of the device type, the printer driver 303 obtains the configuration information from the printer in accordance with necessity and can generate the device type information of the derived type.

As mentioned above, according to the embodiment, in the case where the functions of the printer 5000 cannot be completely covered by the pre-installation type selected by the user from the configuration setting screen, the printer driver 303 can generate the new device type information so that all of the functions can be used. More specifically speaking, by extracting the necessary definition information from the device type information in the external memory 11 and automatically generating the device type information of the new derived type, the printer driver 303 can use all of the capabilities of the printer 5000.

For example, if the user selected the pre-installation type of <standard>, the printer driver 303 can generate the device type information of the derived type by automatically complementing the insufficient capabilities to the capabilities of the printer 5000. Thus, the printer driver 303 can construct a print setting screen which does not include the grayout-displayed items which cannot be set by the user. Usability of the user can be improved.

Embodiment 2

The host computer 4000 in the embodiment generates a name of the device type information of the derived type held in the external memory 11 by such a name that the user can easily grasp the model name and easily switch the model type.

A process of FIG. 14 is similar to that in the embodiment 1.

Subsequently, the process of FIG. 15 will be described with respect to points different from the embodiment 1.

In S1103, the printer driver 303 automatically generates a derived type name by using the device type information of "device type" 501 being selected on the configuration setting screen 500 as a base. For example, in the case of FIG. 5, "device type" 501 is <standard>. Further, in the printer 5000(a) connected to the host computer 4000, it is assumed that a name (model name) is <LBP-100> and an IP address is 169.254.10.10. In this case, the printer driver 303 generates a derived type name as <standard_LBP-100_169.254.10.10>. If a printer on the connection destination side is a USB port, a portion of an IP address is a name like, for example, USB001.

By inserting a character train of the printer name and the IP address into the type name by the printer driver 303, the user can easily identify the printer. By generating the derived type name as mentioned above by the printer driver 303, such a situation that derived types are limitlessly generated can be suppressed, and usability when the user selects the device type can be improved.

In S1108, the printer driver 303 displays a device type 527 in a configuration setting screen in FIG. 11B as a result of the updating of the configuration setting screen in FIG. 5. Thus, the user can grasp not only the type name but also the model name and IP address of the printer 5000.

In S1110, the printer driver 303 stores the device type information of the derived type. At this time, the printer driver 303 stores the device type information in a format like device type information 906 in FIG. 13F. The device type information 906 differs from the device type information 905 with respect to a point that the type name is <standard_LBP-100_169.254.10.10>.

As for the process of FIG. 16, a process of S1202 differs from that in the embodiment 1. However, since the process of S1202 is similar to the process of S1103 in the foregoing embodiment, its description is omitted.

Subsequently, a type switching process in FIG. 18 will be described.

Figure 18:
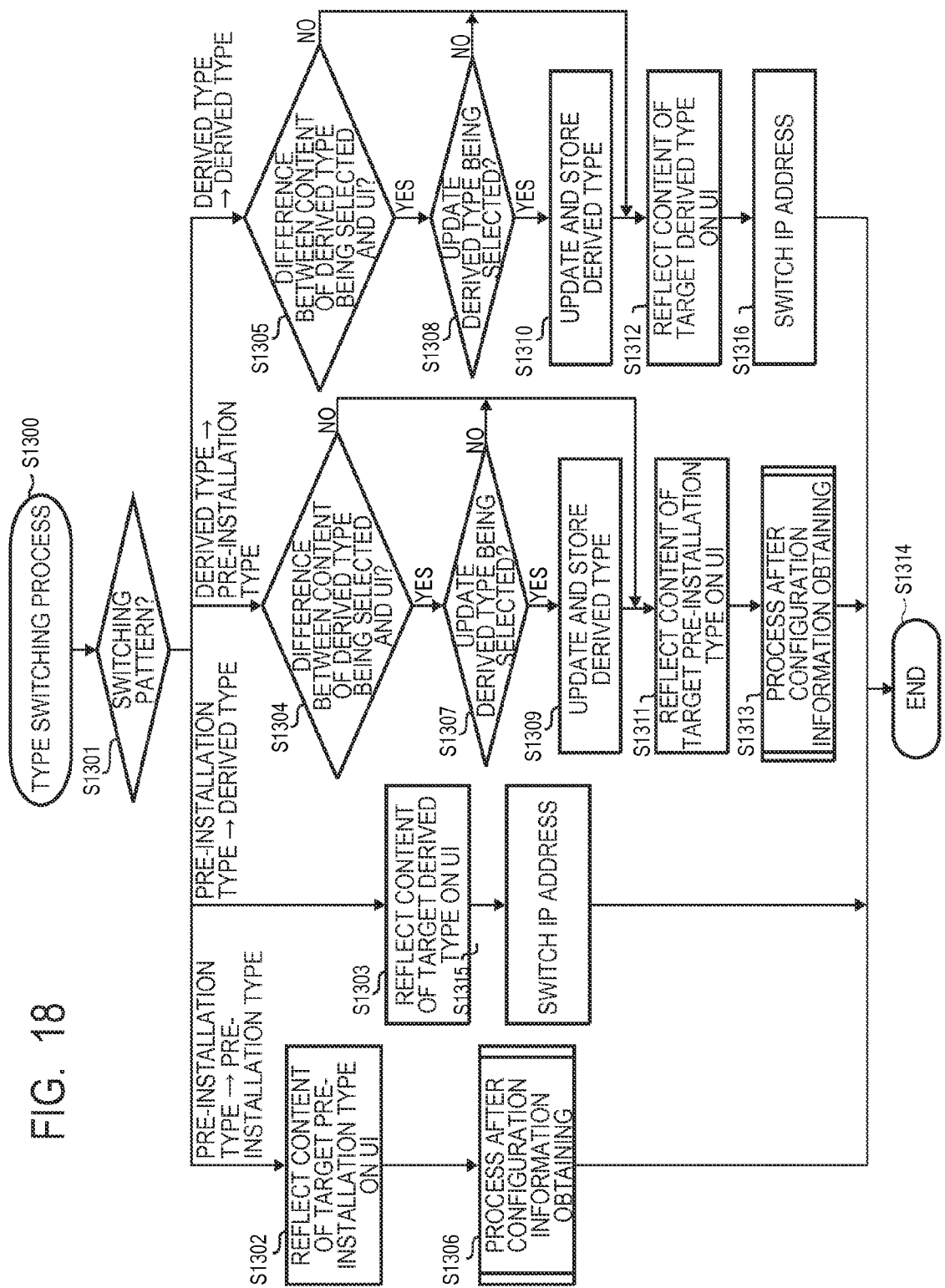
FIG. 18 is a flowchart (part 2) showing an example of the type switching process.

FIG. 18 is a flowchart showing an example of the type switching process in the embodiment. A description of portions which are overlapped with those of the process in FIG. 17 described in the embodiment 1 is omitted.

A process of S1315 is executed after the user switched the pre-installation type to the derived type. Device type information of the derived type is device type information of a derived type name in which the character train of the printer name and the IP address has been inserted. In this case, the printer driver 303 requests a port switching process to the port monitor 305. At this time, the printer driver 303 obtains the IP address to be switched from the type name information showing the derived type name.

A process of S1316 is executed after the user switched the derived type to another derived type. Since the process of S1316 is similar to the process of S1315, its description is omitted.

By the above processes, in the case where the user switches the device type to the device type of the derived type name in which the character train of the printer name and the IP address has been inserted, the printer driver 303 switches the configuration settings and, further, switches the print setting screen. The port monitor 305 executes the switching of the IP address.

As mentioned above, according to the embodiment, if only the type name is grasped, the user can easily discriminate the printer name of the connected printer 5000 and the IP address. Further when the user has switched the device type to the device type of the derived type name in which the character train of the printer name and the IP address has been inserted, the port monitor 305 can switch the IP address on the basis of the IP address of the derived type name.

Embodiment 3

In this embodiment, such a process that the host computer 4000 exports or imports the device type information in order to further improve usability of the user will be described. The host computer 4000 can export or import the device type information of the derived type such as device type information 905, device type information 906, or the like.

Figure 19:
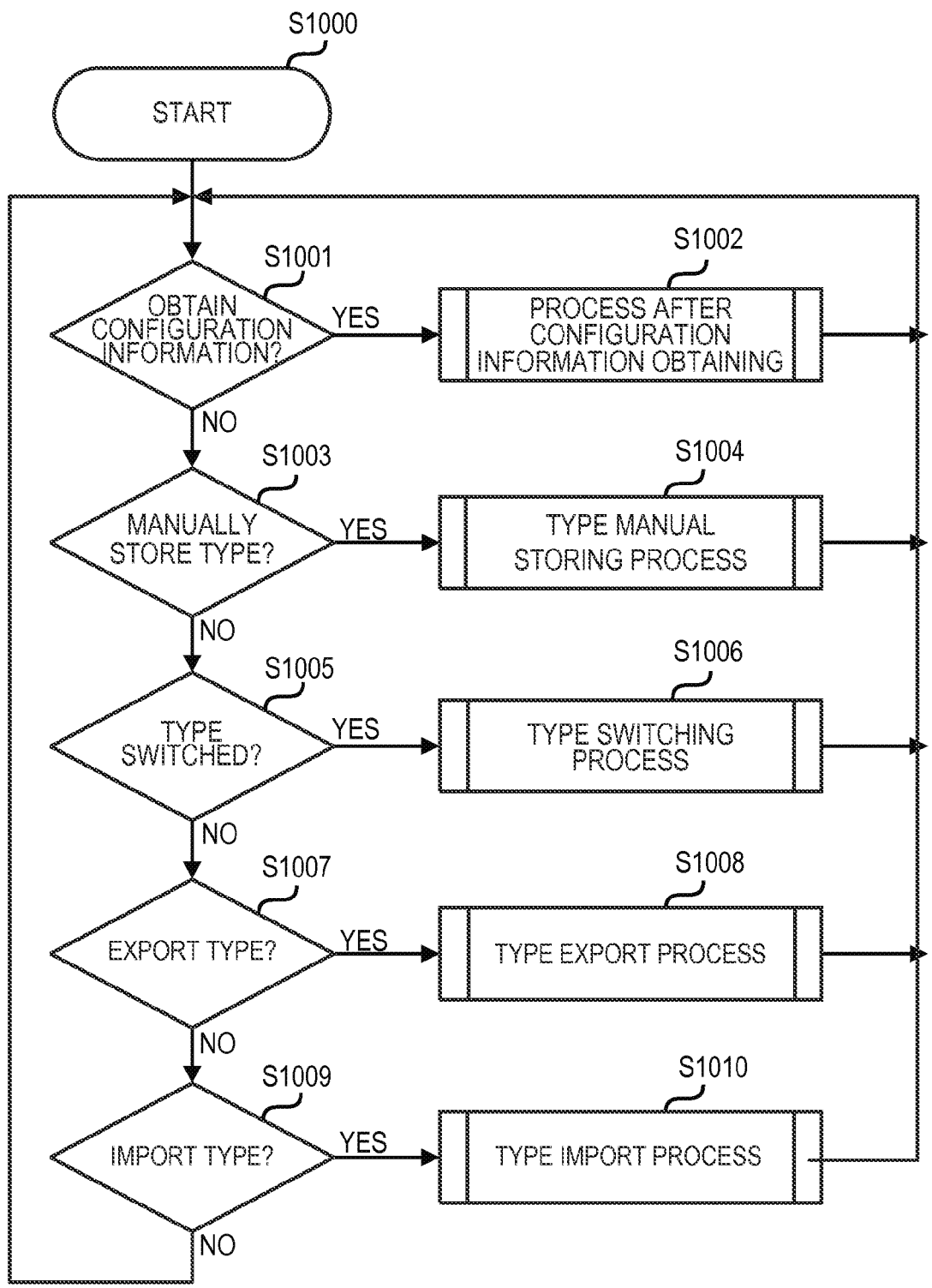
FIG. 19 is a flowchart showing an example of a process in an embodiment 3.

FIG. 19 is a flowchart showing an example of a process in the embodiment 3.

A description of portions which are overlapped with those of the process in FIG. 14 described in the embodiment 1 is omitted.

In S1005, the printer driver 303 discriminates whether or not the device type has been switched. If it is determined that the device type has been switched, S1006 follows. If it is determined that the device type is not switched, S1007 follows.

In S1007, the printer driver 303 discriminates whether or not the device type information is exported. If it is determined that the device type information is exported, S1008 follows. If it is determined that the device type information is not exported, S1009 follows. More specifically speaking, if it is detected that the Export button 503 was depressed by the user, it is determined that the device type information is exported. Details of a process of S1008 will be described hereinafter with reference to FIG. 20.

In S1009, the printer driver 303 discriminates whether or not the device type information is imported. If it is determined that the device type information is imported, S1010 follows. If it is determined that the device type information is not imported, the processing routine is returned to S1001. More specifically speaking, if it is detected that the Import button 503 was depressed by the user, the printer driver 303 determines that the device type information is imported. Details of a process of S1010 will be described hereinafter with reference to FIGS. 21 and 22.

Since processes of S1002, S1004, and S1006 have already been described above in the embodiments 1 and 2, their description is omitted here.

It is not always necessary that the printer driver 303 executes all of processes of S1001, S1003, S1005, S1007, and S1009. For example, the printer driver 303 may execute one or an arbitrary plurality of processes of S1001, S1003, S1005, S1007, and S1009.

Figure 20:
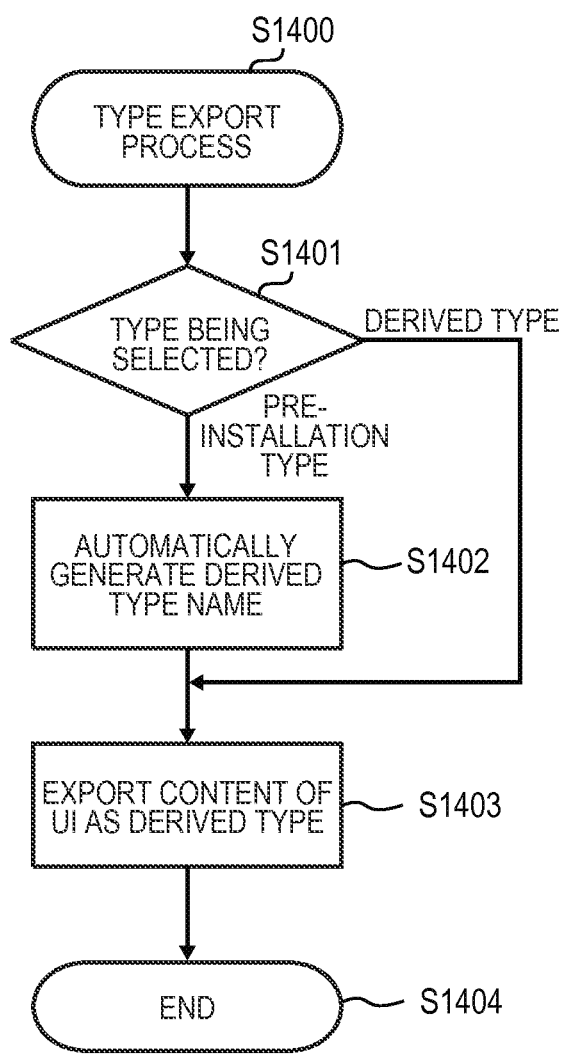
FIG. 20 is a flowchart showing an example of an export process.

FIG. 20 is a flowchart showing an example of an export process.

In S1400, the printer driver 303 starts the process of FIG. 20.

In S1401, the printer driver 303 discriminates whether or not the device type being selected on the configuration setting screen is the pre-installation type or the derived type. If it is determined that the device type is the pre-installation type, S1402 follows. If it is determined that the device type is the derived type, the printer driver 303 advances to S1403.

In S1402, the printer driver 303 automatically generates a derived type name by using the device type information of "device type" 501 being selected on the configuration setting screen as a base. For example, in the case of FIG. 5, since "device type" 501 is <standard>, the printer driver 303 may generate such a name, as a derived type name, that one character has been added to the type name serving as a base like <standard 2> or the like as mentioned above in the embodiment 1. In FIG. 5, in the printer 5000(a) connected to the host computer 4000, it is assumed that the name is <LBP-100> and the IP address is 169.254.10.10. In this case, the printer driver 303 may generate a derived type name as <standard_LBP-100_169.254.10.10> as mentioned above in the embodiment 2. A reason why such a method is used is that since the device type information of the pre-installation type has previously been stored as standard data in the host computer, it is meaningless that the printer driver 303 exports the device type information to another host computer.

In S1403, the printer driver 303 exports the contents of the configuration setting screen 500 as device type information of the derived type. The printer driver 303 stores a file of the exported device type information into the external memory 11. At this time, the user may apply a file name or the like through a name setting screen or the like.

As mentioned above, the printer driver 303 can export the device type information and store into the external memory 11. Thus, the user can use the device type information of the derived type generated by the host computer by another host computer and usability is improved.

Figure 21:
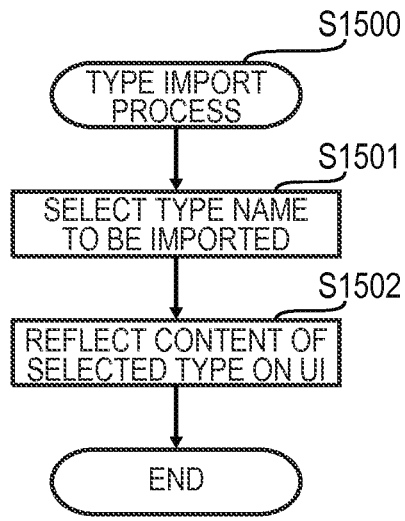
FIG. 21 is a flowchart (part 1) showing an example of an import process.

FIG. 21 is a flowchart showing an example of an import process.

In S1500, the printer driver 303 starts the process of FIG. 21.

In S1501, in response to a user's instruction which is received through a file selecting screen, the printer driver 303 selects the device type name of the device type information to be imported. In this instance, the device type name which is selected by the printer driver 303 is a device type name of the device type information exported by another host computer.

In S1502, the printer driver 303 reflects the contents of the device type information of the selected device type onto the configuration setting screen 500. When the configuration setting screen is updated, the printer driver 303 also changes the print setting screen 600 in accordance with the contents.

By the above processes, the host computer 4000 can construct the configuration setting screen 500 by the contents of the device type information generated by another host computer and usability of the user can be improved. It is presumed that the process of FIG. 21 is executed together with the processes in the embodiment 1.

Figure 22:
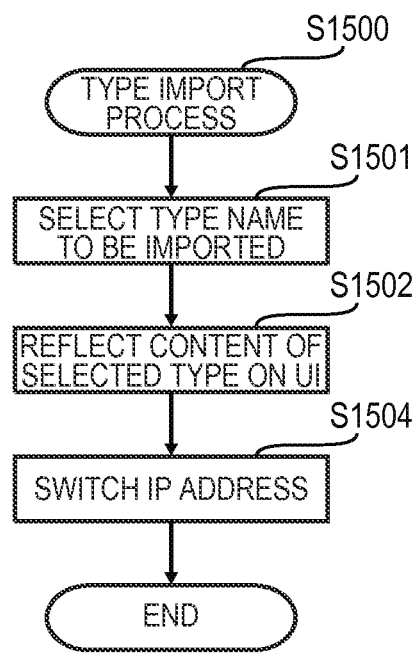
FIG. 22 is a flowchart (part 2) showing an example of the import process.

FIG. 22 is a flowchart showing an example of the import process corresponding to the processes in the embodiment 2.

A description of portions which are overlapped with those in the processes in FIG. 21 is omitted.

In S1504, the printer driver 303 requests a port switching process to the port monitor 305. At this time, the printer driver 303 obtains the IP address necessary to switch the port from the type name information showing the derived type name.

As mentioned above, according to the embodiment, since the printer driver 303 can export and import the device type information, usability of the user can be improved.

The device type information of the derived type is information in which the configuration setting information to the specific printer 5000 is collected. Therefore, by importing the device type information of the derived type, the host computer 4000 can execute the process in consideration of circumstances peculiar to the printer 5000.

For example, it is now assumed that although the printer 5000(b) has the duplex printing function, since it is out of order, such a setting that the duplex printing function is not used has been made by the configuration setting screen. The user instructs the host computer to export the device type information of such a setting, so that the host computer 4000 exports the device type information. In this instance, the host computer 4000 may transmit (distribute) the exported device type information to the host computer of the user who uses the printer 5000(b) in the same workplace and share it. The user who uses the printer 5000(b) imports the device type information transmitted to the host computer. Thus, the user in the same workplace can make the print settings by using the device type information in consideration of such circumstances of the printer 5000(b) that the duplex printing function cannot be used. Usability about the print settings is improved.

According to each of the foregoing embodiments, the technique for improving the usability of the user who makes a function setting of the printer 5000 can be provided.

Although the exemplary embodiments of the invention have been described in detail above, the embodiments are not limited to such specific embodiments but various modifications and changes are possible within the scope of the gist of the invention disclosed in claims.

According to the above-described embodiments, the technique for improving the usability of the user who makes a function setting of the printer can be provided.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM)), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-261766, filed on Dec. 18, 2013, which is hereby incorporated by reference herein in its entirety.

What is claimed is:

1. An information processing apparatus comprising at least one processor and a memory storing instructions which, when executed by the at least one processor, cause the information processing apparatus to:
 select a device type of identifying device type information in which function settings of a printer have been defined;
 obtain configuration information regarding a function construction of the printer as an output target;
 determine whether or not the selected device type is a device type that updating of device information is not permitted, on the basis of type information included in the device type information of the selected device type;
 determine whether or not to store the device type information;
 generate new device type information on the basis of the device type information of the selected device type in the case where it is determined that the selected device type is the device type that the updating of the device information is not permitted and it is determined to store the device type information;
 update the device type information without generating the new device type information in the case where it is determined that the selected device type is a device type that the updating of the device information is permitted and it is determined to store the device type information; and
 not store the device information in the case where it is determined not to store the device type information.

2. The apparatus according to claim 1, wherein the instructions further cause the information processing apparatus to:
 display a function setting screen of the printer,
 wherein the device type information designated by the displayed function setting screen is selected from among device type information stored in a storage area.

3. The apparatus according to claim 1, wherein, when a device type different from the device type being selected is selected, the configuration information is obtained from the printer as the output target.

4. The apparatus according to claim 2, wherein, in the case where there is the function which is not included in the functions regarding the function construction among the functions regarding the function settings, setting items regarding the function which is not included is displayed so as to be excluded from setting targets in the function setting screen.

5. The apparatus according to claim 1, wherein, on the basis of the selected device type, the new device type information in which the functions regarding the function construction are included in the functions regarding the function settings is generated and stored into a storage area.

6. The apparatus according to claim 5, wherein definition information regarding the function which is not included in the functions regarding the function settings among the functions regarding the function construction is extracted from device type information stored in the storage area and the extracted definition information is synthesized to the selected device type, thereby generating the new device type information and storing the new device type information into the storage area.

7. The apparatus according to claim 5, wherein, on the basis of the selected device type, the new device type information is generated by a name including a model name of the printer as the output target and an address and is stored into the storage area.

8. The apparatus according to claim 1, wherein, in the case where an address is included in a name of the selected device type, the instructions further cause the information processing apparatus to switch the printer as the output target to a printer corresponding to the address, and
wherein configuration information regarding a switched function construction of the printer is obtained.

9. An information processing apparatus comprising at least one processor and a memory storing instructions which, when executed by the at least one processor, cause the information processing apparatus to:
select a device type of identifying device type information in which function settings of a printer have been defined;
set functions which are valid in the printer as an output target on the basis of the device type information of the selected device type;
obtain configuration information regarding a function construction of the printer as the output target;
determine whether or not the selected device type is a device type that updating of the device information is not permitted, on the basis of type information included in the device type information of the selected device type;
determine whether or not to store the device type information;
generate new device type information on the basis of the device type information onto which the set functions were reflected in the case where it is determined that the selected device type is the device type that updating of the device information is not permitted and it is determined to store the device type information;
update the device type information without generating the new device type information in the case where it is determined that the selected device type is a device type that the updating of the device information is permitted and it is determined to store the device type information; and
not store the device information in the case where it is determined not to store the device type information.

10. The apparatus according to claim 9, wherein the instructions further cause the information processing apparatus to display a function setting screen of the printer including a display regarding an obtaining instruction of the configuration information,
wherein the device type information designated by the displayed function setting screen is selected from among device type information stored in a storage area, and
when the obtainment of the configuration information is instructed on the function setting screen, the configuration information is obtained from the printer as the output target.

11. The apparatus according to claim 9, wherein the instructions further cause the information processing apparatus to store the device type information onto which the set functions were reflected into a storage area,
wherein, on the basis of the device type information onto which the set functions were reflected and which has been stored, the new device type information is generated and stored into the storage area.

12. The apparatus according to claim 9, wherein, on the basis of the device type information onto which the set functions were reflected, the new device type information in which the functions regarding the function construction are included in the functions regarding the function settings is generated and stored into a storage area.

13. The apparatus according to claim 12, wherein definition information regarding the function which is not included in the functions regarding the function settings among the functions regarding the function construction is extracted from device type information stored in the storage area and the extracted definition information is synthesized to the device type information onto which the set functions were reflected, thereby generating the new device type information and storing the new device type information into the storage area.

14. The apparatus according to claim 12, wherein, on the basis of the device type information onto which the set functions were reflected, the new device type information is generated by a name including a model name of the printer as the output target and an address and is stored into the storage area.

15. An information processing method which is executed by an information processing apparatus, the method comprising:
selecting a device type of identifying device type information in which function settings of a printer have been defined;
obtaining configuration information regarding a function construction of the printer as an output target;
determining whether or not the selected device type is a device type that updating of device information is not permitted, on the basis of type information included in the device type information of the selected device type;
determining whether or not to store the device type information;
generating new device type information on the basis of the device type information of the selected device type in the case where it is determined that the selected device type is the device type that the updating of the device information is not permitted and it is determined to store the device type information;
updating the device type information without generating the new device type information in the case where it is determined that the selected device type is a device type that the updating of the device information is permitted and it is determined to store the device type information; and
not storing the device information in the case where it is determined not to store the device type information.

16. An information processing method which is executed by an information processing apparatus, the method comprising:
selecting a device type of identifying device type information in which function settings of a printer have been defined;
setting functions which are valid in the printer as an output target on the basis of the device type information of the selected device type;

obtaining configuration information regarding a function construction of the printer as the output target;

determining whether or not the selected device type is a device type that updating of device information is not permitted, on the basis of type information included in the device type information of the selected device type;

determining whether or not to store the device type information;

generating new device type information on the basis of the device type information onto which the set functions were reflected in the case where it is determined that the selected device type is the device type that the updating of the device information is not permitted and it is determined to store the device type information;

updating the device type information without generating the new device type information in the case where it is determined that the selected device type is a device type that the updating of the device information is permitted and it is determined to store the device type information; and not storing the device information in the case where it is determined not to store the device type information.

17. A non-transitory computer-readable storage medium storing a program for causing a computer to:

select a device type of identifying device type information in which function settings of a printer have been defined;

obtain configuration information regarding a function construction of the printer as an output target;

determine whether or not the selected device type is a device type that updating of device information is not permitted, on the basis of type information included in the device type information of the selected device type;

determine whether or not to store the device type information;

generate new device type information on the basis of the device type information of the selected device type in the case where it is determined that the selected device type is the device type that the updating of the device information is not permitted and it is determined to store the device type information;

update the device type information without generating the new device type information in the case where it is determined that the selected device type is a device type that the updating of the device information is permitted and it is determined to store the device type information; and not store the device information in the case where it is determined not to store the device type information.

* * * * *